United States Patent
Hotta et al.

(10) Patent No.: US 9,420,236 B2
(45) Date of Patent: Aug. 16, 2016

(54) MONITORING SYSTEM AND MONITORING METHOD

(75) Inventors: Miyako Hotta, Hitachi (JP); Masanori Miyoshi, Mito (JP); Wataru Ito, Nishitokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 617 days.

(21) Appl. No.: 13/809,587

(22) PCT Filed: Mar. 9, 2011

(86) PCT No.: PCT/JP2011/055533
§ 371 (c)(1),
(2), (4) Date: Jan. 10, 2013

(87) PCT Pub. No.: WO2012/008176
PCT Pub. Date: Jan. 19, 2012

(65) Prior Publication Data
US 2013/0113934 A1    May 9, 2013

(30) Foreign Application Priority Data
Jul. 12, 2010    (JP) .................................. 2010-157668

(51) Int. Cl.
*G06K 9/00*    (2006.01)
*H04N 7/18*    (2006.01)
(Continued)

(52) U.S. Cl.
CPC .............. *H04N 7/18* (2013.01); *G06K 9/00778* (2013.01); *G06T 7/2066* (2013.01);
(Continued)

(58) Field of Classification Search
None
See application file for complete search history.

(56) References Cited

U.S. PATENT DOCUMENTS 8,686,326 B1 *    4/2014    Dennison .............. F41G 7/2246
                                                      244/3.1
8,946,606 B1 *    2/2015    Dennison et al. ............ 244/3.16
(Continued)

FOREIGN PATENT DOCUMENTS

JP    2006-085366 A    3/2006
JP    2006-99241 A    4/2006
(Continued)

OTHER PUBLICATIONS

Ullah et al., "Orientation Code Matching or Robust Object Search," Paper, IEICE Trans. Inf. & Syst., vol. E84-D, No. 8, Aug. 2001, pp. 999-1006.
(Continued)

*Primary Examiner* — Jeremaiah C Hallenbeck-Huber
*Assistant Examiner* — Samuel D Fereja
(74) *Attorney, Agent, or Firm* — Miles & Stockbridge P.C.

(57) ABSTRACT

It is an object of the present invention to provide a monitoring system that captures and inputs video images of a crowd with a surveillance camera for detecting normal and/or various abnormal states. The monitoring system (MS) comprises: a video image input means (1) that captures and inputs the video images of the crowd; an optical-flow calculating means (2) that calculates optical flows from the video images captured at different times; a judgment-block setting means (3) that sets judgment blocks on a surveillance area of each video image, each judgment block serving as a unit to be judged about an abnormality; an optical-flow attribute counting means (4) that counts an attribute of optical flows generated in each judgment block; a normality-evaluating-index calculating means (5) that calculates, from the counted attribute of the optical flows, an evaluation value of a normality-evaluating index for evaluating a normality of the judgment block; an abnormal-state judging means (6) that judges, from the evaluation value of the normality-evaluating index, the abnormal state of the judgment block; and an output means (7) that outputs a result of the judgment made by the abnormal-state judging means onto the video image.

12 Claims, 17 Drawing Sheets

(51) Int. Cl.
  *G06T 7/20* (2006.01)
  *G08B 13/196* (2006.01)

(52) U.S. Cl.
  CPC ......... *G08B 13/19613* (2013.01); *H04N 7/183* (2013.01); *G06T 2207/10016* (2013.01); *G06T 2207/20021* (2013.01); *G06T 2207/30232* (2013.01)

(56) References Cited

U.S. PATENT DOCUMENTS

| | | | | |
|---|---|---|---|---|
| 2003/0117611 | A1* | 6/2003 | Chon | G06T 7/0018 356/5.01 |
| 2006/0133785 | A1* | 6/2006 | Ko et al. | 396/54 |
| 2007/0047809 | A1* | 3/2007 | Sasaki | G06K 9/00791 382/170 |
| 2007/0122058 | A1* | 5/2007 | Kitaura et al. | 382/284 |
| 2008/0069399 | A1* | 3/2008 | Nagao et al. | 382/103 |
| 2008/0166020 | A1 | 7/2008 | Kosaka et al. | |
| 2009/0222388 | A1* | 9/2009 | Hua et al. | 706/12 |
| 2009/0225300 | A1* | 9/2009 | Barrows | G01P 3/36 356/28.5 |
| 2010/0027844 | A1* | 2/2010 | Akita | 382/103 |
| 2010/0079624 | A1 | 4/2010 | Miyasako | |
| 2010/0234730 | A1* | 9/2010 | Fukuzawa et al. | 600/443 |
| 2010/0272311 | A1* | 10/2010 | Nir et al. | 382/100 |
| 2010/0315505 | A1* | 12/2010 | Michalke et al. | 348/118 |
| 2011/0116584 | A1* | 5/2011 | Hunt, Jr. | G06T 7/20 375/350 |
| 2011/0243390 | A1* | 10/2011 | Eggert et al. | 382/107 |

FOREIGN PATENT DOCUMENTS

| | | |
|---|---|---|
| JP | 2007-243342 A | 9/2007 |
| JP | 2008-269063 A | 11/2008 |
| JP | 2009-086748 A | 4/2009 |
| JP | 2010-079655 A | 4/2010 |
| JP | 2010-225118 A | 10/2010 |
| WO | WO 2006/080367 A1 | 8/2006 |

OTHER PUBLICATIONS

Takauji et al., "Robust Tagging in Strange Circumstances," Paper, IEEJ Trans. EIS, vol. 125, No. 6, 2005, pp. 926-934.

* cited by examiner

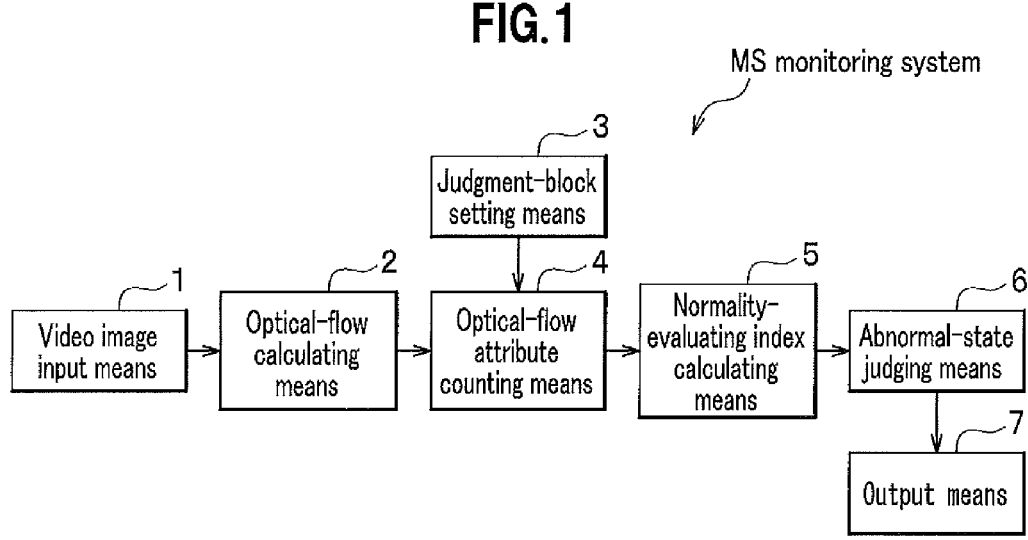
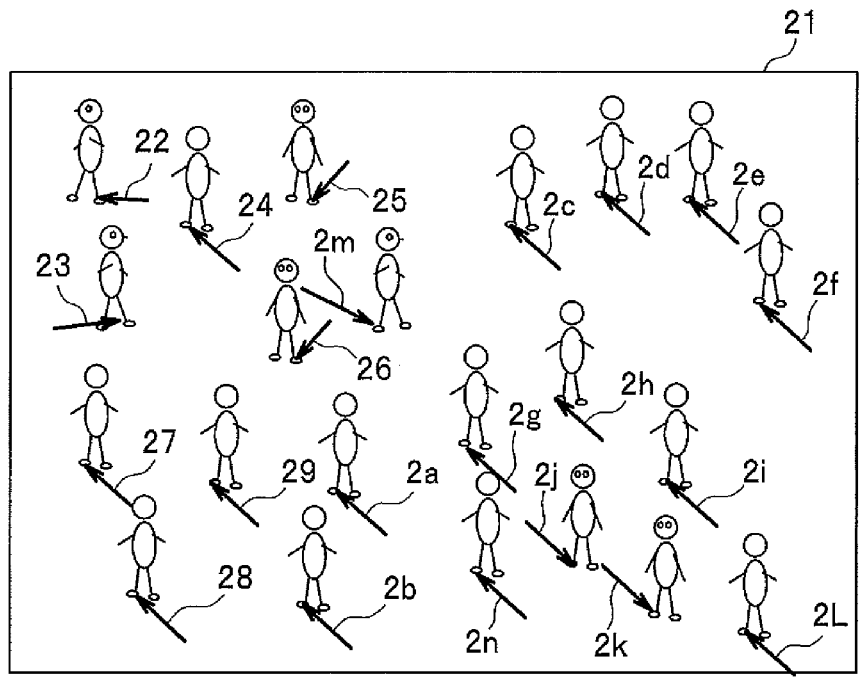

FIG.13A Image at time t
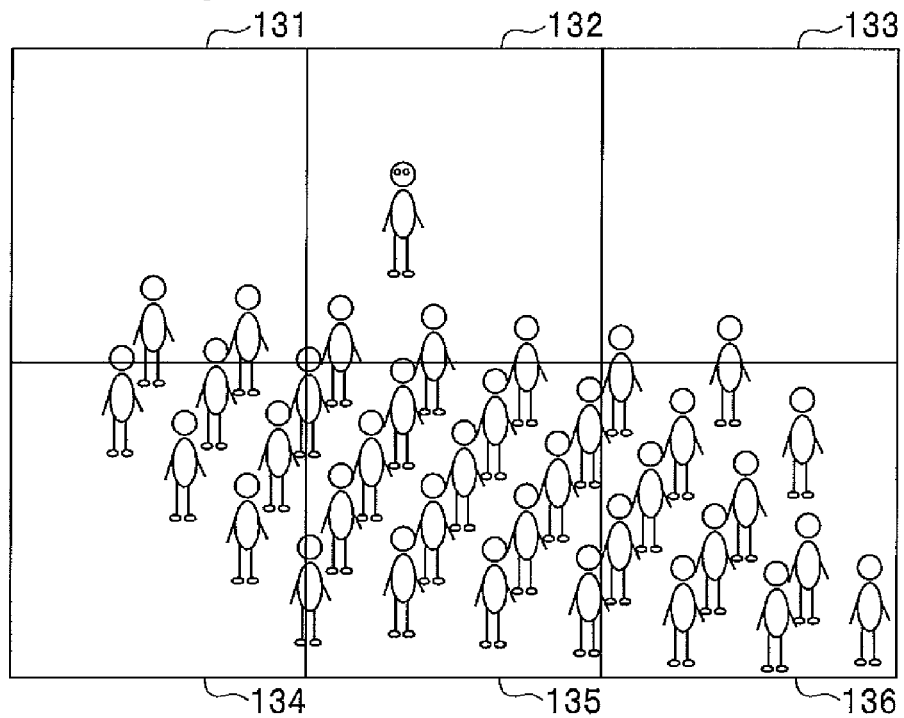
FIG.13B Image at time t+n
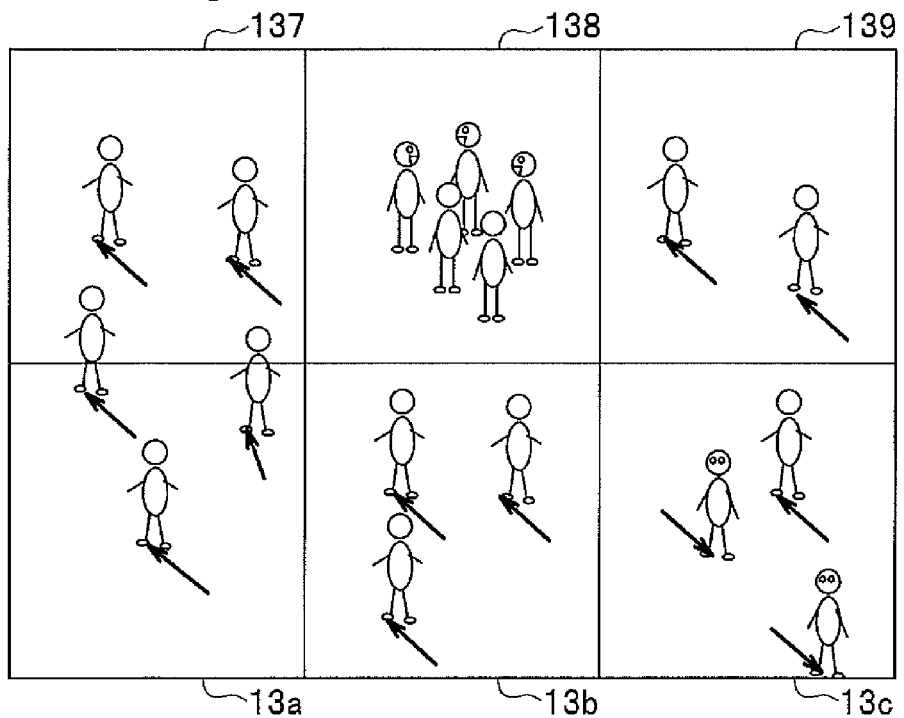

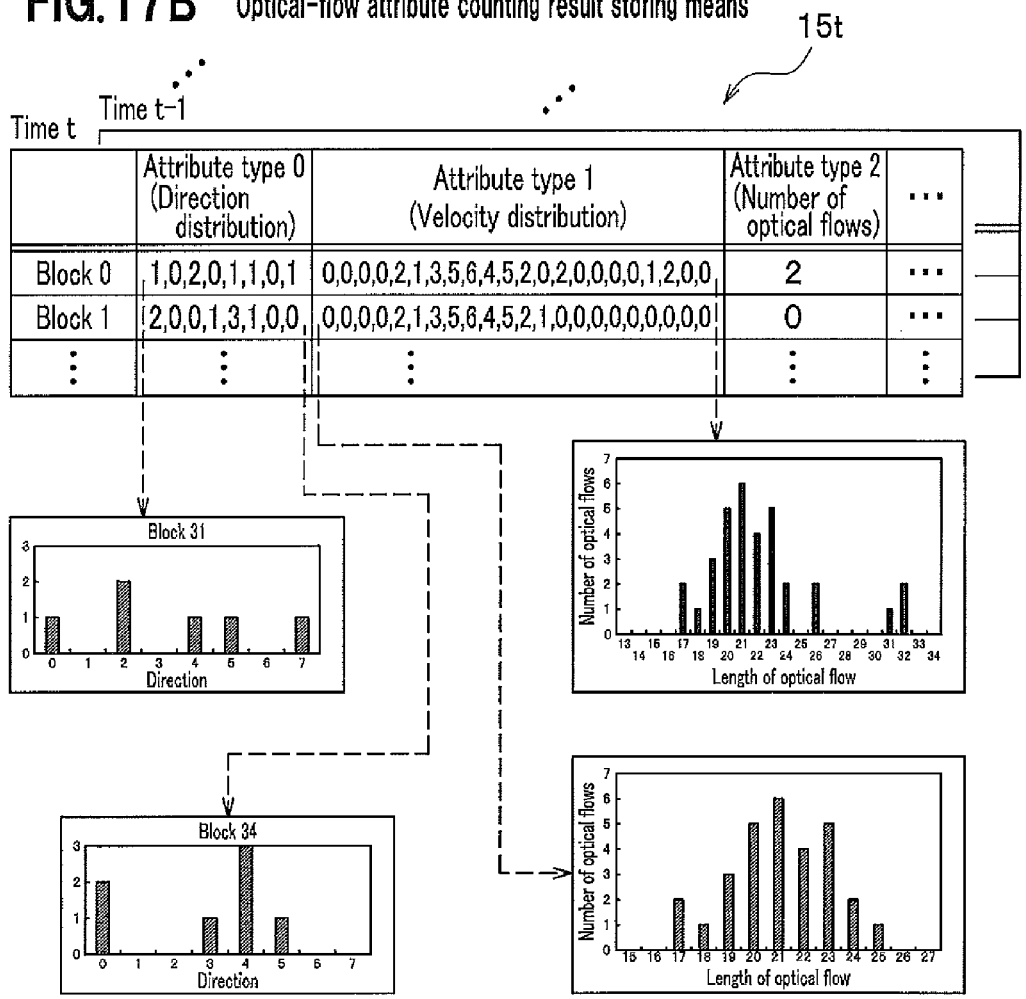
FIG. 17A Optical-flow attribute type storing means
FIG. 17B Optical-flow attribute counting result storing means FIG.18A  Normality-evaluating index type storing means

| Normality-evaluating index type ID | Normality-evaluating index type |
|---|---|
| 0 | Direction concentration |
| 1 | Angle |
| 2 | Reverse movement degree |
| ⋮ | ⋮ |

~15u

FIG.18B  Normality-evaluating index value storing means

15v

Time t, Time t-1

| | Normality-evaluating index 0 (Direction concentration) | Normality-evaluating index 1 (Angle) | Normality-evaluating index 2 (Reverse movement degree) | Normality-evaluating index 3 ($\mu - 2\sigma$) | ... |
|---|---|---|---|---|---|
| Block 0 | 0.66 | 135 | 1 | 15 | ... |
| Block 1 | 1.0 | 180 | 0.4 | 17 | ... |
| ⋮ | ⋮ | ⋮ | ⋮ | ⋮ | ⋮ |

FIG.19A  Abnormality judgment type storing means

| Abnormality judgment ID | Abnormality judgment type |
|---|---|
| 0 | Reverse movement |
| 1 | Velocity abnormality |
| 2 | Abrupt change |
| ⋮ | ⋮ |

15w

FIG.19B  Abnormality judgment result storing means

15x

Time t, Time t-1 ...

| | Abnormality judgment 0 (Reverse movement) | Abnormality judgment 1 (Velocity abnormality) | Abnormality judgment 2 (Abrupt change) | ... |
|---|---|---|---|---|
| Block 0 | 0 | 1 | 0 | ... |
| Block 1 | 1 | 0 | 0 | ... |
| ⋮ | ⋮ | ⋮ | ⋮ | ⋮ |

MONITORING SYSTEM AND MONITORING METHOD

TECHNICAL FIELD

The present invention relates to a monitoring system and a monitoring method for detecting normal and/or various abnormal states from video images of a crowd captured with a surveillance camera.

BACKGROUND ART

For early detection of crimes, dangerous actions and the like at public places such as a railway station, an airport, a public square and a hall where an unspecified large number of people gather, there is a demand for technologies for monitoring a crowd with a camera and automatically detecting an abnormal state of the crowd. Examples of conventional techniques for detecting an abnormal state of the crowd include ones described below. In the following description, the term "crowd" refers to human beings when a crowd is monitored.

In a method and a program in Patent document 1, an observation area where particles move randomly is divided into small regions, and a region which shows a greater temporal change in the number of particles than the rest of the regions is detected as an abnormal region in which more particles make different movements than in the rest of the regions. The method and the program of Patent document 1 are also intended to be used for detecting a person or people in a crowd whose movements differ from the ones of other people.

Patent document 2 discloses a technique to calculate optical flows from video-image data and calculate an average of lengths (velocities) of the optical flows and a variance thereof, and detecting a local change in a crowd based on the average and the variance.

PRIOR ART DOCUMENTS

Patent Documents

Patent document 1: WO2006/080367
Patent document 2: Japanese Unexamined Patent Application Publication No.: 2006-99241

SUMMARY OF THE INVENTION

Problems to be Solved by the Invention

The technique of patent document 1 is based on the assumption that random movements having not specific direction patterns and unidirectional movements are a norm, and thus is applicable only to detection of objects of which movements differ from the ones of others but not to detection in a scene of a crowd where there are movements having various directional patterns.

The technique of patent document 2, on the other hand, only pays attention to lengths of optical flows, and is inapplicable to detection of abnormalities related to direction such as reverse movement. Further, the technique judges the presence or absence of a difference between the regions in a statistical amount such as an average of the lengths of optical flows and a variance thereof, and is only able to detect occurrence of abnormality but not what the abnormality is.

The present invention has been made to solve the above problems, and it is an objective of an aspect of the present invention to provide a monitoring system and a monitoring method for detecting, for general purpose, normal and/or various abnormal states from video images of a crowd captured with a surveillance camera.

Means of Solving the Problems

To solve the above problems, the present invention provides a monitoring system that captures and inputs video images of a crowd including a plurality of moving objects for detecting an abnormal state of the crowd from movement data obtained from the video images, the monitoring system comprising: a video image input means for capturing and inputting the video images of the crowd; an optical-flow calculating means for calculating optical flows from the video images captured at different times; a judgment-block setting means for setting judgment blocks on a surveillance area of each video image, each judgment block serving as a unit to be judged about an abnormality; an optical-flow attribute counting means for counting an attribute of optical flows generated in each judgment block; a normality-evaluating-index calculating means for calculating, from the counted attribute of the optical flows, an evaluation value of a normality-evaluating index for evaluating a normality of the judgment block; an abnormal-state judging means for judging, from the evaluation value of the normality-evaluating index, the abnormal state of the judgment block; and an output means for outputting a result of the judgment made by the abnormal-state judging means onto the video image.

The optical-flow attribute counting means quantifies the attribute as a direction of the optical flows generated in the judgment block and providing a distribution thereof according to the direction, the normality-evaluating-index calculating means determines top two directions of optical flows from the distribution provided according to the direction, calculating evaluation values of respective three normality-evaluating indices which are a direction concentration, an angle, and a reverse movement degree, the direction concentration being a degree of concentration of the number of optical flows having the top two directions, the angle being an angle formed between the top two directions, and the reverse movement degree being a ratio of the number of optical flows having one of the top two directions to the number of optical flows having the other direction, and when there is a reverse movement against a main stream, the abnormal-state judging means judges that the block is in the abnormal state, based on the evaluation values of the three normality-evaluating indices. The other means will be described later.

Effect of the Invention

According to the present invention, it is possible to detect, for general purpose, normal and/or various abnormal states from captured video images of a crowd.

BRIEF DESCRIPTION OF DRAWINGS

FIG. 1 is a block diagram showing a configuration of a monitoring system according to a first embodiment of the present invention.
FIG. 2 is a view image on which optical flows calculated on the basis of the image are overlaid.
FIGS. 5A-5C show examples of distributions of optical flows by direction code for the judgment blocks 31, 32, 34, respectively, of FIG. 3.

FIGS. 13A and 13B are views showing an example in which on video images input by the video image input means 1 at different times, optical flows calculated by the optical-flow calculating means 2 are overlaid. An image of FIG. 13A is captured and input at time t, and an image of FIG. 13B is captured and input at time t+n, which is a time later by n frames than the time at which the image of FIG. 13A is captured and input.

FIGS. 17A and 17B are views explaining items to be stored in the optical-flow attribute type storing means and in an optical-flow attribute counting result storing means. FIG. 17A shows the content stored in the optical-flow attribute type storing means 15s. FIG. 17B shows an example of the items stored in the optical-flow attribute counting result storing means 15t.

FIGS. 18A and 18B are views explaining items stored in the normality-evaluating index type storing means and in a normality-evaluating index value storing means. FIG. 18A shows an example of the normality-evaluating index type storing means 15u. FIG. 18B shows examples of items stored in the normality-evaluating index value storing means 15v.

FIGS. 19A and 19B are views showing items stored in the abnormality judgment type storing means and in an abnormality judgment result storing means. FIG. 19A shows an example of the abnormality judgment type storing means 15w. FIG. 19B shows an example of the abnormality judgment result storing means 15x.

EMBODIMENTS FOR CARRYING OUT THE INVENTION

Figure 3:
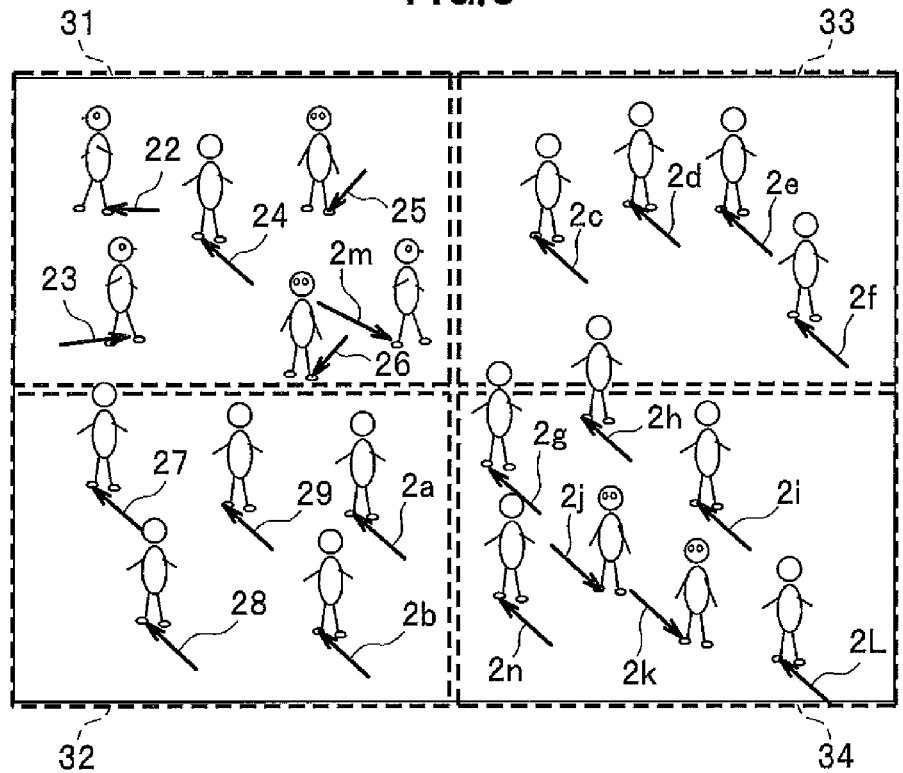
FIG. 3 is a view showing an example in which judgment blocks are set in the image.

In the following paragraphs, embodiments of a monitoring system according to the present invention will be described in detail with reference to the drawings.

First Embodiment

FIG. 1 is a block diagram showing a configuration of a first embodiment of the monitoring system according to the present invention. The monitoring system MS of FIG. 1 includes a video image input means 1, an optical-flow calculating means 2, a judgment-block setting means 3, an optical-flow attribute counting means 4, a normality-evaluating-index calculating means 5, an abnormal-state judging means 6, and an output means 7.

In this embodiment, the monitoring system MS monitors a crowd including a plurality of moving objects. The moving object is not limited to a person, but may be an animal, a bicycle with a person thereon, or the like.

The video image input means 1 captures video images of an area to be monitored such as a railway station, an airport, a public square, or a hall, with a camera from above or nearby. Then, if the camera is an analog camera, the video image input means 1 converts the analogue video image data into digital data, and inputs the digital data time-sequentially into an image storing means (not shown) where the data are stored in the order of an image at time t, an image at time t−1, and an image at time t−2 with the current time as "t".

The optical-flow calculating means 2 is a means for calculating optical flows from the input images. The optical flow is a vector representing the direction and amount of the movement of an object. The optical flow is calculated as the movement between two images captured at different times. For a particular method to calculate optical flows, it is described in, for example, "Digital image processing", CG-ARTS Association, pp. 243-245. Any method can be used that can achieve an object of the present invention of obtaining a characteristic of movements of a crowd by calculating optical flows.

FIG. 2 is a view image on which optical flows calculated on the basis of the image are overlaid. In an image area 21, the optical flows are represented by arrows 22, 23, . . . , 29, 2a, . . . , 2n. Symbol "L" in Reference numeral "2L" is capitalized to avoid confusion between an alphabetical lower case "l" and a numeral "1".

In FIG. 2, for the sake of simplicity, a single optical flow is calculated per person. A plurality of optical flows may be calculated per person, however, and in a method to calculate optical flows by detecting a characteristic area such as a corner and thereby making tracking, the number of optical flows is not limited to one per person but a large number of optical flows may be calculated per person. The present invention is applicable to either case. Directions indicated by the arrows 22, 23, . . . , 29, 2a, . . . , 2n are directions of movements.

Referring back to FIG. 1, the judgment-block setting means 3 is a means for setting, in advance, in each of the input images, at least one block area for judging whether or not an abnormal state has occurred. Referring to FIG. 3, how to set a judgment block will be described.

FIG. 3 is a view showing an example in which judgment blocks are set in an image. In FIG. 3, the judgment blocks are set in the image of FIG. 2. The image area is divided into four areas which are judgment blocks 31, 32, 33, and 34 (hereinafter referred to also as "blocks"). A status of occurrence of optical flows in each block is analyzed. The block is sized according to the type of the abnormal state to be detected, to the resolution or the like. In the example of FIG. 3, the blocks are equally sized. However, the blocks may have sizes different from each other and any sizes determined according to an attribute of a scene to be monitored. In this example, which block each person belongs to is determined based on the location of the person's feet. It is also effective to set blocks by converting the image of a scene as it is seen by the eye into the scene based on real coordinates, which is then divided into units of the same area. Or, it is possible to put the overall image area as a block of a large area.

Referring back to FIG. 1, the optical-flow attribute counting means 4 counts, for each block, an attribute such as the number, and respective directions and velocities of the optical flows calculated by the optical-flow calculating means 2, to obtain a characteristic amount. In the first embodiment 1, an example is taken in which a state in which another stream, than a main stream, such as "reverse movement" exists is detected, wherein "directions" of the optical flows as an attribute are counted. For the other attributes, they will be described in other embodiments.

In FIG. 3, an example is shown in which, on a frame of a video image, optical flows generated at the time point when the frame is captured are overlaid. Directions indicated by the arrows are movement directions of the respective optical flows. In FIG. 3, the optical flows 22-2n are included in the judgment blocks 31-34 set by the judgment-block setting means 3.

The optical-flow attribute counting means 4 counts optical flows generated in each block by direction and provides a direction distribution of the optical flows. For how to convert information having direction into direction codes, a method of Nonpatent document 1 is known. This technique is to convert image brightness gradient into direction code data.

[Nonpatent document 1] ULLAH Farhan, S. Kaneko and S. Igarashi, "Orientation code matching for robust object search", IEICE Trans. on Inf. & Sys., Vol. E84-D, No. 8, pp. 999-1006, 2001.

Figure 4:
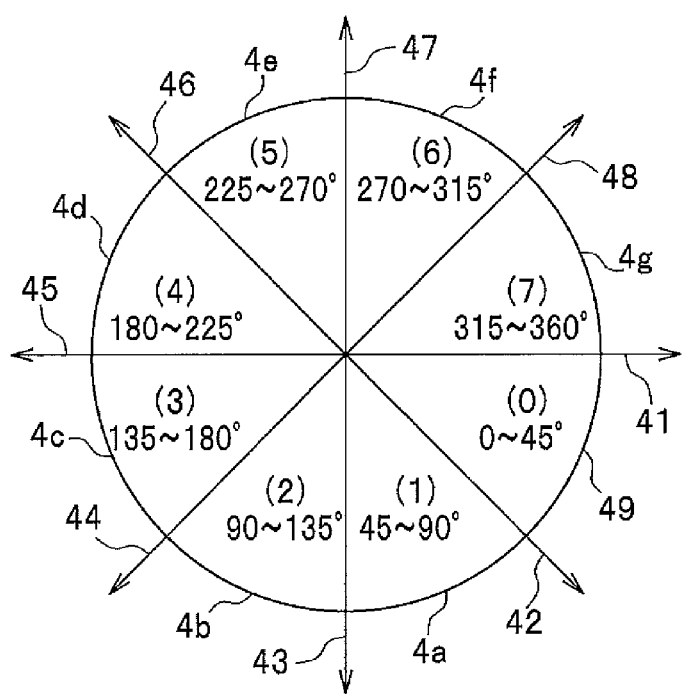
FIG. 4 is a graph for explaining a method of converting the optical flows into direction codes for calculating a direction distribution of the optical flows.

FIG. 4 is an illustration for explaining a method of converting each of optical flows into one of direction codes when providing a direction distribution of the optical flows. In this example, the directions of optical flows are converted into eight (8) direction codes. In FIG. 4, direction codes 41-48 are directions of optical flows each serving as a reference used when encoding according to the direction.

The directions of the optical flow calculated by the optical-flow calculating means 2 are obtained in a range of 0-360 continuous degrees when one of the directions is put as a basis. The range of 0-360 continuous degrees is divided into given angular sections so as to be quantified into integers. In the example of FIG. 4, the range of 0-360 continuous degrees is divided into angular sections of 45° with a right horizontal direction 41 as the basis (0°) so as to quantify the optical flows according to which angular section each optical flow belongs to. For example, with the direction 41 as the basis, an optical flow with an angle of 20° is given the direction code "0" and an optical flow with an angle of 100° is given the direction code "2".

As described above, the optical flow directions are each converted into one of the direction codes of integers "0" to "7" by angle, and then, the optical flows generated in each block are counted according to the direction code.

Figure 5A:
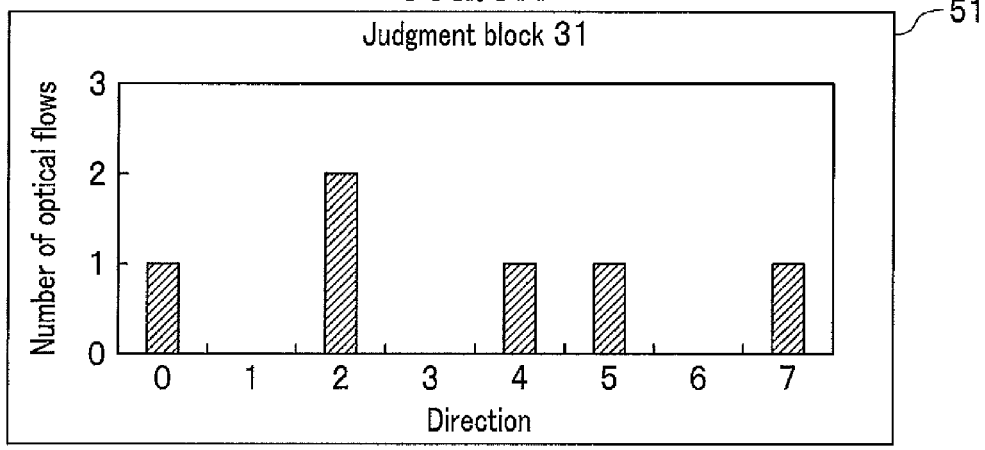
FIGS. 5A-5C are views showing examples of distributions of the optical flows by direction code.
Figure 5B:
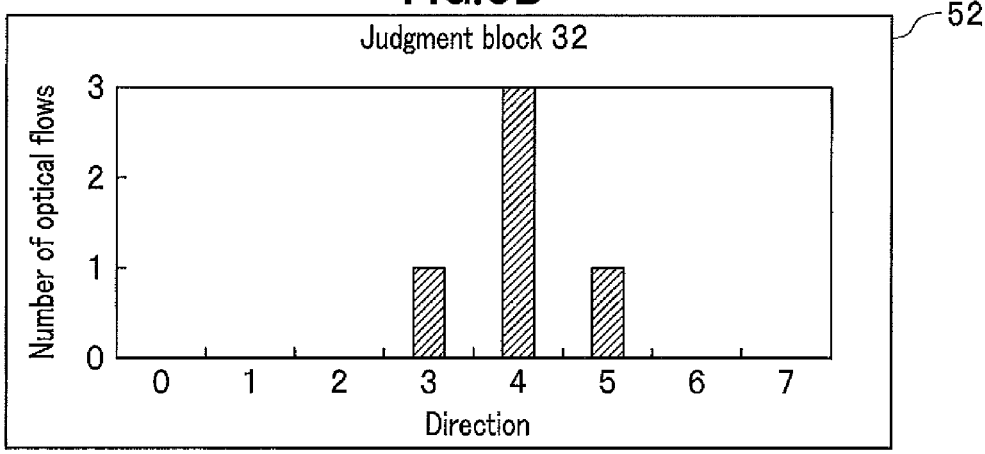
Figure 5C:
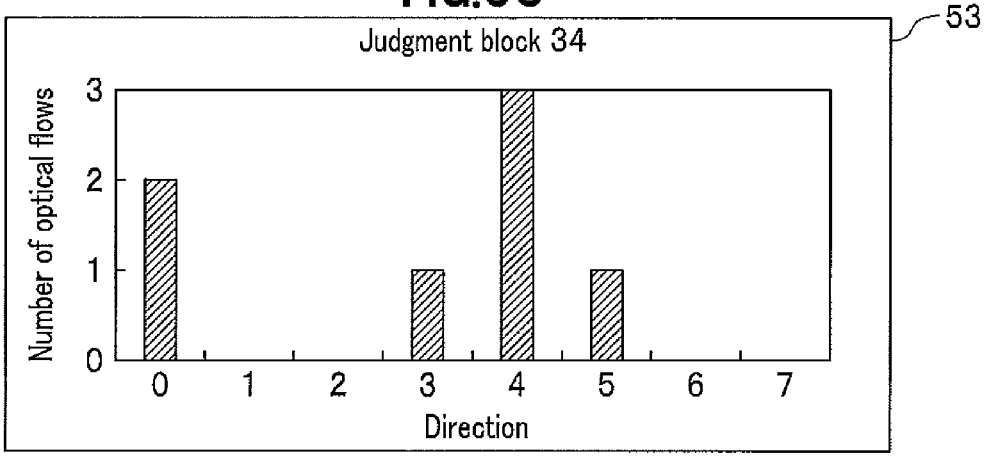

FIGS. 5A-5C are views showing examples of distributions of optical flows by direction code. FIGS. 5A-5C show examples of distributions of optical flows by direction code for the judgment blocks 31, 32, 34, respectively, of FIG. 3. FIGS. 5A-5C show histograms 51-53. The histogram 51 (see FIG. 5A) represents a direction distribution of optical flows in the judgment block 31 of FIG. 3. The histogram 52 (see FIG. 5B) represents a direction distribution of optical flows in the judgment block 32 of FIG. 3. The histogram 53 (see FIG. 5C) represents a direction distribution of optical flows in the judgment block 34 of FIG. 3.

In the judgment block 31, six optical flows 22-26, 2m generated vary greatly in direction, and the graph obtained is as represented by the histogram 51. In the judgment block 32, optical flows 27-29, 2a, 2b vary more or less but substantially the same in direction, and the distribution obtained is as represented by the histogram 52. In the judgment block 34, optical flows 2g, 2h, 2i, 2L, 2n are substantially the same in direction, whereas optical flows 2j, 2k are opposite in direction from the other five optical flows, and the distribution obtained is as represented by the histogram 53.

In FIGS. 5A-5C, in a case as with the judgment block 31 where there are a variety of directions of optical flows (movements of persons), there is no notable peak in a direction distribution as seen in the histogram 51. In a case as with the judgment block 32 where there is only one direction of optical flows, on the other hand, a great peak exists as in the histogram 52. In a case as with the judgment block 34 where there is a reverse movement against main streams, the following characteristics are recognizable from a direction distribution, that is, as seen from the histogram 53, there are two great peaks; and an angle between the directions with the two peaks is almost 180°.

As described above, it is possible to extract characteristics of movements of people in each block by counting the attribute of the optical flows generated in each judgment block. In this example, eight (8) direction codes are provided to quantify the optical flow directions, but the number of direction codes is not limited to it and may be 16 for example. How many direction codes are provided for quantification is determined according to the type of the abnormal state to be detected.

In the above embodiment, the attribute of the optical flows generated in a single frame is counted. However, it is also effective to count the optical flows of a number of continuous frames.

If the video image input means 1 inputs 30 frames of images per second, for example, counting the optical flows of 10 consecutive frames of images results in processing 0.33 seconds of information. It is effective to count the optical flows of a number of frames from the view point of noise removal and smoothing process of data as well.

Referring back to FIG. 1, now, the normality-evaluating-index calculating means 5 will be described.

The normality-evaluating-index calculating means 5 is a means for calculating evaluation values of indices for evaluating a normality based on the attribute (in the embodiment, direction) counted by the optical-flow attribute counting means 4. The normality-evaluating-index calculating means 5 sets evaluating indices according to the type of a phenomenon to be detected.

In the present embodiment, the evaluating indices are ones to detect "occurrence of a reverse movement against main streams".

In the example of the video image of the crowd of FIG. 3, in the judgment block 34, the optical flows 2g, 2h, 2i, 2n, 2L have an upper left direction, whereas the optical flows 2j, 2k have a lower right direction.

The histogram 53 of FIG. 5C shows the result obtained by counting the attribute of the optical flows generated in this block.

When there is a reverse movement occurring against main streams, the following two characteristics are found in a direction distribution:
(a) two respective directions have great peaks; and
(b) an angle between the two directions is approximately 180°.

Accordingly, calculating respective evaluation values of the three indices (direction concentration, angle, reverse movement degree) in items (1)-(3) below enables detection for the reverse movement.

Figure 6:
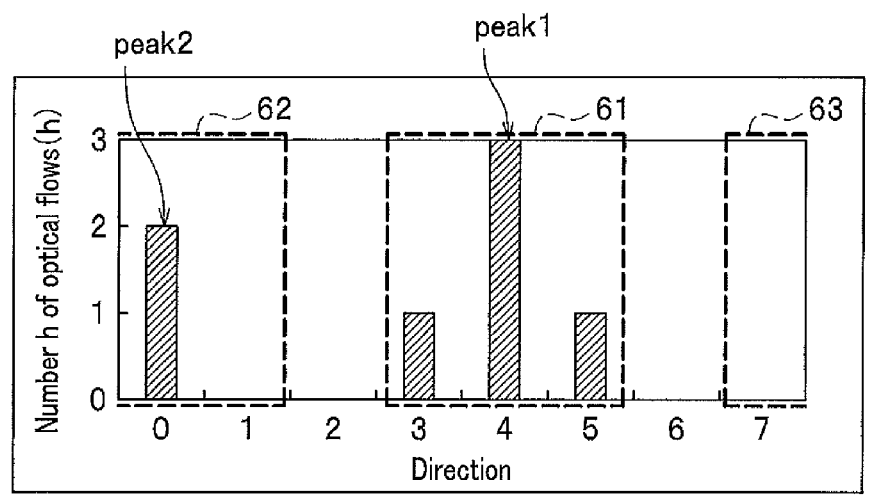
FIG. 6 is a view showing how to determine the top two peaks.

FIG. 6 is a view showing how to obtain the top two peaks. In order to calculate the evaluation values, first, the directions which have the two peaks are found from the direction distribution. In the direction distribution of FIG. 6, the greatest number of optical flows is located over the direction code "four" and indicated in FIG. 6 by "peak 1". The second greatest number of optical flow is located over the direction code "zero" and indicated in FIG. 6 by "peak 2". In this example, peak 1=4, and peak 2=0.

Further, the greatest number h of optical flows (peak 1) and the second greatest number h of optical flows (peak 2) are calculated. Here, each number calculated may be one represented by the corresponding bin alone. If some allowance is made with the definition of the direction, however, it is possible to add bins on both sides of the corresponding bin. In such a case, the greatest number h of optical flows (peak 1) is the one located in an area denoted by Reference numeral 61 in FIG. 6, whereas the second greatest number h of optical flows (peak 2) is the one located in the combined areas respectively denoted by Reference numerals 62 and 63. In this example, h(peak 1)=5, and h(peak 2)=2. The term "bin" means each of groups into which a range of finite numerical values is divided in a histogram.

Using those values, respective values of the following three indices are determined.
(1) direction concentration: a ratio of the number of optical flows having the top two directions in a block to the total number of the optical flows in the block. If there are a great variety of optical flow directions, the index has a small value, whereas if there are only two or less optical flow directions, the index has a great value.

$$\text{Direction concentration} = \frac{h(\text{peak}1) + h(\text{peak}2)}{\sum_{n=0}^{N1} h(n)} \quad (1)$$

h(i): the number of optical flows in direction I
N: the number of direction codes
(2) angle: an angle formed between the directions with the peak 1 and peak 2 is determined.

$$\text{Angle} = \text{abs}(\theta(\text{peak}1) - (\theta(\text{peak}2))$$

θ(i): angle)(°) of direction $I$ (2)

(3) reverse movement degree: a ratio of the second greatest number of optical flows to the greatest number of optical flows is determined.

$$\text{Reverse movement degree} = \frac{h(\text{peak}2)}{h(\text{peak}1)} \quad (3)$$

In order to judge the phenomenon "reverse movement", values of the above indices for example are calculated based on direction distribution data. As described above, the normality-evaluating-index calculating means 5 calculates one or more indices able to represent by a value or values a phenomenon to be detected, based on the attribute counted by the optical-flow attribute counting means 4.

Referring back to FIG. 1, now the abnormal-state judging means 6 will be described.

The abnormal-state judging means 6 is a means for judging whether or not the state of each block is a normal or abnormal state based on the indices calculated by the normality-evaluating-index calculating means 5. A method to judge is determined according to the type of an abnormal state to be detected. However, in a case where the evaluation values can be used, those evaluation values are compared with predetermined threshold values for determination. In a case where it is intended to make judgment of a block of an image area by comparison with the other surrounding blocks of the image area, the evaluation values of the block may be compared with those of each of the other blocks. Further, in a case where it is intended to observe state changes in time, the evaluation values of a block in an image may be compared with those of that same block in the previous images.

In the present embodiment, an example is taken in which "reverse movement" is detected. The presence or absence of "reverse movement" is judged by comparison between evaluation values, of the indices "direction concentration", "angle", and "reverse movement degree", calculated by the normality-evaluating-index calculating means 5 and respective corresponding threshold values of those indices.

For example, the judgment conditions are set with respect to the threshold values as follows:
Condition (i) direction concentration>th1
Condition (ii) th2<angle<th3
Condition (iii) th4<reverse movement degree<th5
If Conditions (i), (ii) and (iii) are satisfied, then it is judged that "reverse movement" has been detected.

Otherwise, it is judged that the state of the block is "normal".

In the above operation, "direction concentration" is an index for judging whether or not optical flows do not have a great variety of directions but have only two directions, and, for example, 60% or more of all optical flows need to have mainly two directions. Thus, for example:
th1=0.8.

The "angle" is an index for determining what angle is required to be formed between the directions in order for "reverse movement" to be detected. The "angle" is required to be, for example, 150° to 210°. Thus, for example:
th2=150, and
th3=210.

The "reverse movement degree" is an index used for determining a ratio of the number of streams having directions different from those of main streams, relative to the number of the main streams. This is an index determined according to a definition of the "reverse movement". If, for example, a phenomenon that people not more than those forming the main streams move in a reverse direction is a phenomenon to be detected as abnormal, then the number of optical flows that make the "reverse movement" should be a number equal to or less than the number of optical flows of the main stream and further, an extremely small number of optical flows that make the "reverse movement" should be excluded so as not to erroneously detect noise. Thus, for example:

th4=0.1, and
th5=0.5.

Now, actual judgment processing will be described by taking an example of evaluation of the judgment block 31 and the judgment block 34 of FIG. 3. The evaluating indices calculated from the histogram 51 of FIG. 5A which shows the direction distribution of the judgment block 31 of FIG. 3 are as follows:

direction concentration=(h(2)+h(5))/6=(2+2)/6=0.66
angle=abs($\theta$(2)−$\theta$(5))=135°
reverse movement degree=h(5)/h(2)=1.0

None of the above three indices satisfies its corresponding judgment condition, so that it is judged that the judgment block 31 is "normal".

On the other hand, the evaluating indices calculated from the histogram 53 of FIG. 5C which shows the direction distribution of the judgment block 34 are as follows:

direction concentration=(h(4)+h(0))/7=(5+2)/7=1.0
angle=abs($\theta$(4)−$\theta$(0))=180°
reverse movement degree=h(0)/h(4)=2/5=0.4

All the above three indices satisfy their corresponding judgment conditions, so that it is judged that the judgment block 34 has "reverse movement". In the above paragraphs, examples of the case where blocks are judged as abnormal and the case where blocks are judged as normal have been described, and in the same manner, all the blocks are subjected to the normality/abnormality judgment. In the above, there has been described the processing of the abnormal-state judging means 6.

Referring back to FIG. 1, the output means 7 is a means for outputting the abnormal state judgment made by the abnormal-state judging means 6. The output means 7 may overlay and output the processing process, judgment result, or the like on an input image on a monitor screen. Description will be made of examples of an image area output with reference to FIG. 7-FIG. 9.

Figure 7:
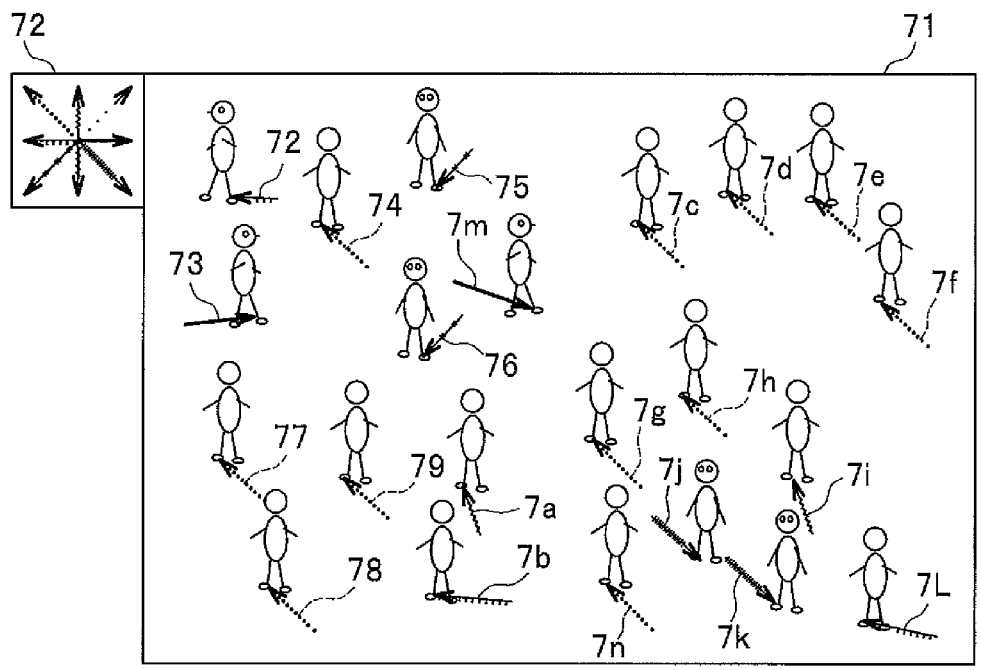
FIG. 7 is a view showing an example in which optical flows calculated by an optical-flow calculating means 2 are color-coded according to the direction code and overlaid on an input image 71.

FIG. 7 is a view showing an example in which optical flows calculated by the optical-flow calculating means 2 are color-coded by direction code and overlaid on an input image 71.

Optical flows 72-79, 7a-7n are calculated by the optical-flow calculating means 2 and overlaid in the image area. The optical flows 72-79, 7a-7n are depicted in colors corresponding to their direction codes according to a legend shown in a rectangle 72.

It is effective to overlay the optical flows on the image area in order to make a spatial distribution of optical flow directions visually lucid. The color-coding is more effective in various colors than in monochrome.

Figure 8:
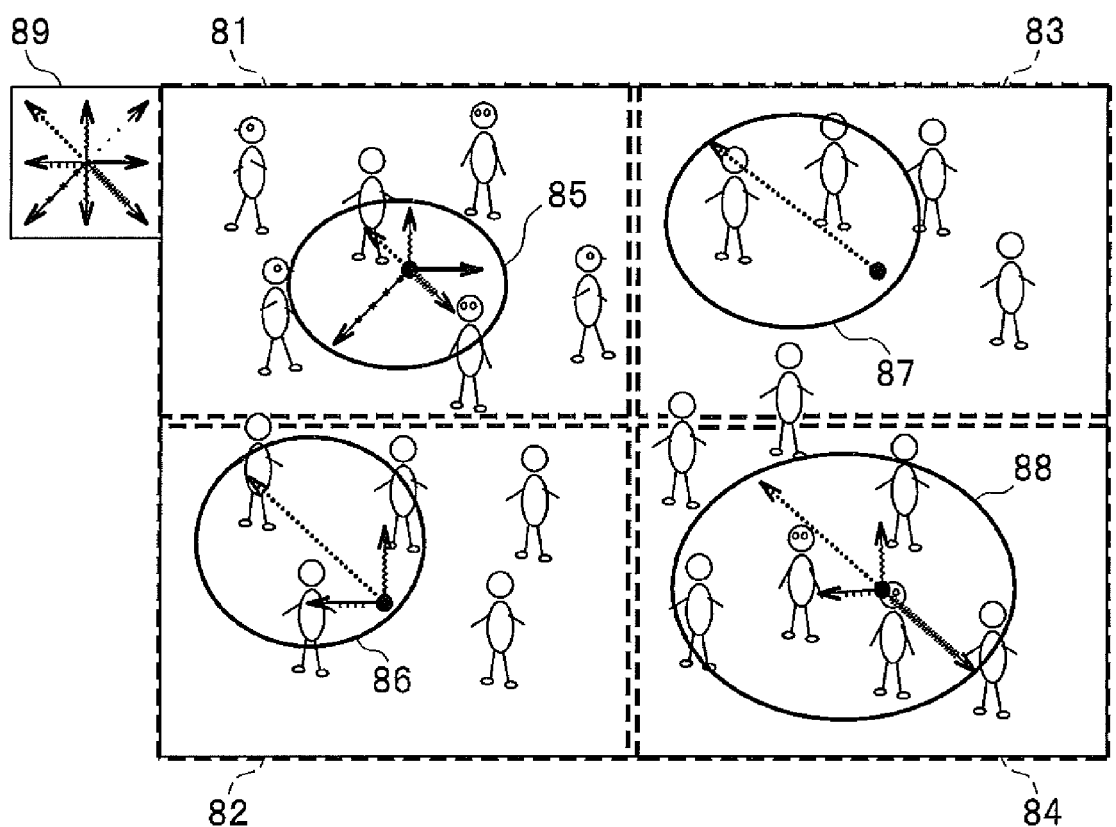
FIG. 8 is a view showing an example in which a result obtained by the counting made by an optical-flow attribute counting means 4 is overlaid on an input image.

FIG. 8 is a view showing an example in which a result obtained by counting by the optical-flow attribute counting means 4 is overlaid on an input image. In FIG. 8, in circles 85, 86, 87, 88, there are shown direction distributions of optical flows generated in respective judgment blocks 81, 82, 83, 84.

The orientation and color-coding of arrows indicating respective directions is made with reference to a legend shown in a rectangle 89. The length of each arrow indicates the number of optical flows with the direction of that arrow. This output method is effective in making the direction distribution of each block visually lucid. The color-coding is more effective in various colors than in monochrome, as in FIG. 7.

Figure 9:
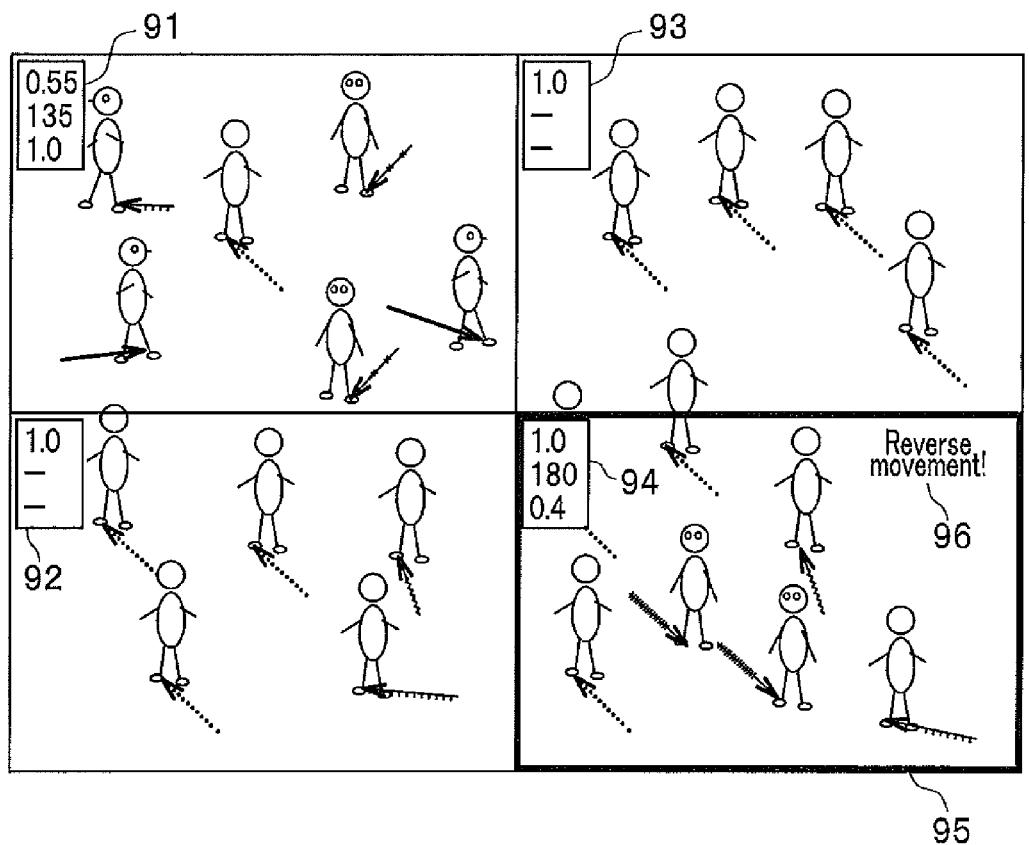
FIG. 9 is a view showing an example in which evaluation values of the indices calculated by a normality-evaluating-index calculating means 5 and a judgment result obtained by an abnormal-state judging means 6 are overlaid on an input image.

FIG. 9 is a view showing an example in which evaluation values of the indices calculated by the normality-evaluating-index calculating means 5 and a judgment result obtained by the abnormal-state judging means 6 are overlaid on an input image. The values (evaluation values) of the indices (direction concentration, angle, reverse movement degree) calculated by the normality-evaluating-index calculating means 5 are displayed in each of rectangles 91, 92, 93, 94 included in respective blocks of the input image of FIG. 9. In addition, the block judged as being in an "abnormal" state by the abnormal-state judging means 6 may be highlighted with a rectangle 95 in a bold line and a type of the abnormal state may be indicated by an indication 96. Further, numerals indicating the evaluation values of the indices inside the rectangles 91-94 may be depicted in different colors according to whether each evaluation value is within or outside its corresponding range of threshold values so as to make it visually easier to grasp the state of each block. Further, it is also effective to use eye-catching colors for depicting the rectangle 95 of the block judged as being in an "abnormal" state and the indication 96 that serves to indicate the type of the abnormal state. For the colors used for depicting the rectangle 95 and the indication 96, different types of abnormal states may be indicated in different colors so that the type of abnormal state according to the present embodiment can be differentiated from the later-described types of abnormal states according to other embodiments, resulting in more effective indication of the judgment result.

Further, in the above example, the evaluation values of each index are displayed in different regions of the image area, respectively. It is possible, however, to prepare three monitor screens and output the evaluation values of each index onto one of the three monitor screens, or display the evaluation values of each index on a single monitor screen, or switch image areas from one to another wherein one image area displays the evaluation values of each index, by a click with a mouse or an input with a keyboard. Any one of these is chosen according to the importance of a place to be monitored and the size of a view. In the above, description is made of examples of how to input the evaluation values of the indices. However, the method to input is not limited to these, but may be any that produce similar effects.

As modifications, the output means 7 may be configured to output into a recording unit (not shown), when there is detected an abnormal state, data on a judgment block in which the abnormal state has occurred, time, and type of the abnormal state, as well as video images. Such modification is effective when there is no observer ready always in a scene of an incident or accident, which requires a later verification of the scene, and when there is a need to collect data as to which types of abnormal states are apt to occur in the area under surveillance, and the like. Further, the output means 7 may be configured to input data into both the monitor screen and the recording device.

As still another example, in a case where the monitoring system MS is connected through a network to a center, with surveillance cameras installed in many places, it is effective to configure the output means 7 so that it outputs not the detail or particular of an abnormal state but the occurrence of the abnormal state alone to the center.

The above is the description on the first embodiment. In the present embodiment, as an example of the type of an abnormal state to be detected, "reverse movement" is described.

However, altering the threshold values of the angle which is an index leads to a potential to detect for actions such as "queue cutting".

Second Embodiment

Now, a second embodiment will be described.

In the second embodiment, from a direction distribution of optical flows, an evaluation value of "richness" indicating "disruption in the direction" is calculated to detect "disturbance of the movement of a crowd". How to convert brightness gradients into direction codes and provide a direction distribution of optical flows in order to calculate an evaluation value of "richness" is described in Nonpatent document 2.
[Nonpatent document 2] TAKAUJI Hidenori, KANEKO Shun'ichi, and TANAKA Takayuki: "Robust Tagging in Strange Circumstance", IEEJ Trans. EIS, Vol. 125, No. 6, pp. 926-934, 2005.

From a direction distribution of optical flows of a given block that is provided by the optical-flow attribute counting means 4, an evaluation of the richness R is calculated by Eq. (4).

$$E = -\sum_{i=0}^{N-1} P(i)\log 2P(i) \quad (4)$$

$$E\max = \log 2N$$

$$R = \begin{cases} \dfrac{E - \alpha E\max}{E\max - \alpha E\max} & \text{if } E \geq \alpha E\max \\ 0 & \text{otherwise} \end{cases}$$

E: entropy
N: the number of direction codes
P(i): relative frequency of direction I
Emax: entropy maximum value
α: weight coefficient for threshold value The evaluation value of the richness R calculated ranges from zero (0) to one (1). The richness R is an index; the closer the evaluation value of the richness R is to zero (0), the less variety of directions of optical flows there are, whereas the closer the evaluation value of the richness R is to one (1), the more variety of directions of optical flows there are. From the direction distribution represented by the histogram 51 and the direction distribution represented by the histogram 52 of FIG. 5B, the richness R of the judgment block 31 and the judgment block 32 of FIG. 3 are evaluated to obtain the following evaluation values:

the evaluation value of the richness R of the judgment block 31 is 0.51 the evaluation value of the richness R of the judgment block 32 is 0

(when the weight coefficient for threshold value a is set to 0.5).

The richness R enables distinction between the state of the judgment block 31 in which there are more variety of directions of optical flows and the state of the judgment block 32 in which there are less variety of directions of optical flows. Accordingly, for example, properly setting the threshold value (to 0.5 for example) enables an abnormal-state judgment to be made on a block with a richness R equal to or more than a given value. When applied to an area in which the direction of the flow of people is relatively fixed such as the passage of the train station building that links to platforms, evaluation with the richness R is effective for detecting occurrence of an abnormal state in which there is a disturbance in the direction of the flow of people.

In the present embodiment, the normality-evaluating-index calculating means 5 calculates an entropy from a direction distribution, and the abnormal-state judging means 6 judges that an area with a large entropy is in an abnormal state in which there is a disturbance in the flow.

Third Embodiment

Now, a third embodiment will be described. In the first and second embodiments, the direction distribution is obtained to detect an abnormal state such as "reverse movement" or "a disturbance in the flow of people". In the third embodiment, the velocity distribution is obtained to detect a state in which "there is a mixed movement that is different in velocity from others in the surrounding area". In FIG. 1, the present embodiment is the same as the first embodiment in the configurations of the video image input means 1 and the optical-flow calculating means 2, and the detailed description of these means is omitted.

Figure 10:
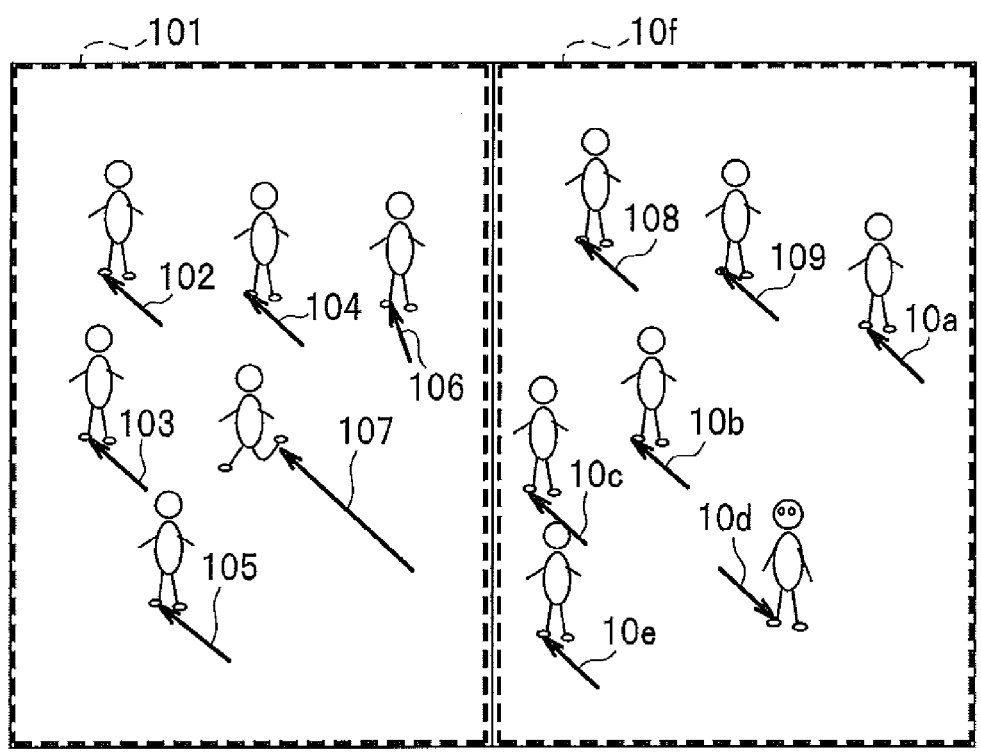
FIG. 10 shows an example in which, on a video image input by a video image input means 1, optical flows calculated by the optical-flow calculating means 2 are overlaid.

FIG. 10 shows an example in which, on a video image input by the video image input means 1, optical flows calculated by the optical-flow calculating means 2 are overlaid. A judgment block 101 has optical flows 102-107 calculated whereas a judgment block 10f has optical flows 108-109, and 10a-10e calculated. For the sake of simplicity, it is assumed that a single optical flow is calculated per person. However, a plurality of optical flows may be calculated per person as in the first embodiment.

In FIG. 10, in the judgment block 10f, the crowd are walking substantially at the same velocity. In the judgment block 101, on the other hand, there is a person running so that there is an optical flow 107 longer than others.

In the third embodiment, the optical-flow attribute counting means 4 provides a velocity distribution of optical flows and detects the presence or absence of outliers in the velocity distribution and if there are outliers, it is judged that there is a movement that is different in velocity from others and thus a block with the outliers is in an "abnormal state".

Figure 11A:
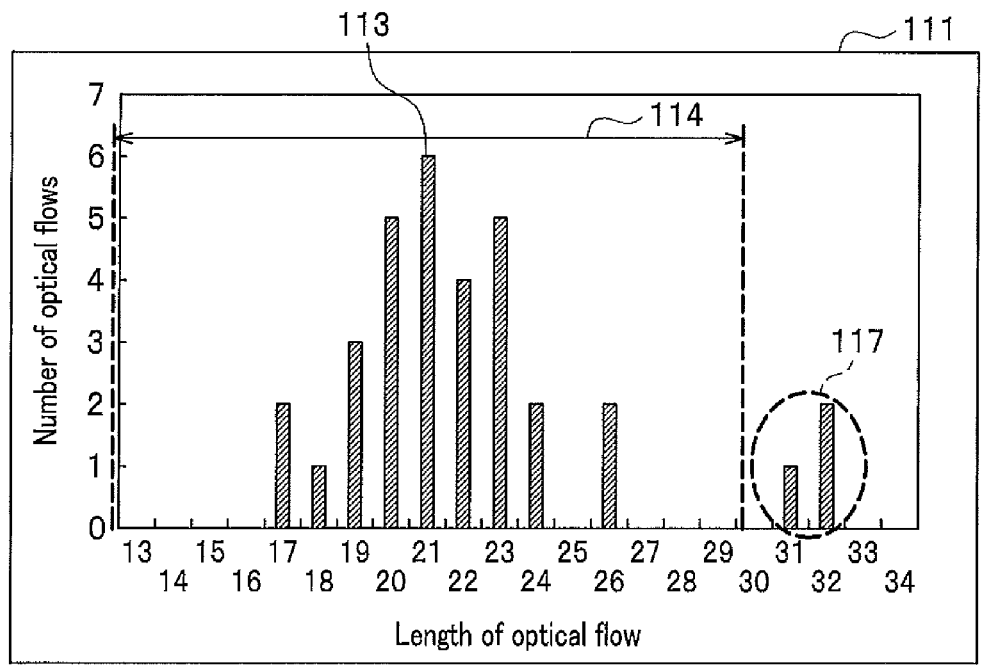
FIGS. 11A and 11B are views each showing a histogram representing the velocity distribution as a result of counting, by the optical-flow attribute counting means 4, velocity of the optical flows that have been calculated by the optical-flow calculating means 2. A velocity distribution of optical flows in the judgment block 101 of FIG. 10 is represented by a histogram 111 of FIG. 11A, and a velocity distribution of optical flows in the judgment block 10f of FIG. 10 is represented by the histogram 112 of FIG. 11B.
Figure 11B:
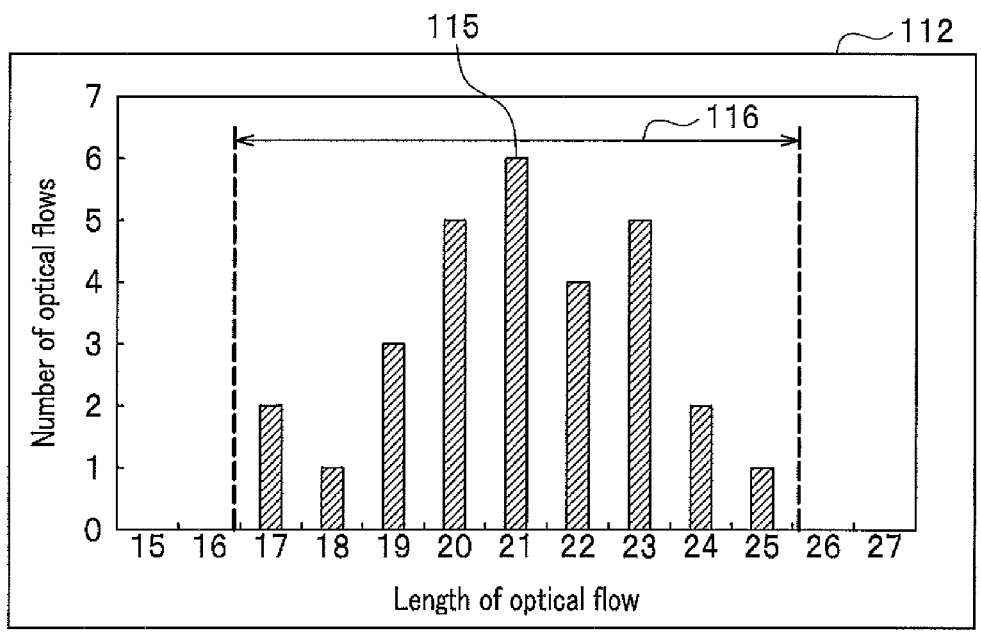

FIGS. 11A and 11B are views each showing a histogram representing the velocity distribution provided by the optical-flow attribute counting means 4 counting velocity of the optical flows that have been calculated by the optical-flow calculating means 2. A velocity distribution of optical flows in the judgment block 101 of FIG. 10 is represented by a histogram 111 of FIG. 11A, and a velocity distribution of optical flows in the judgment block 10f of FIG. 10 is represented by the histogram 112 of FIG. 11B.

In this example, it is assumed that a number of frames of optical flows are counted. Further, in this example, it is assumed that the camera is disposed at a position sufficiently high to capture images of a crowd from an overhead view, which does not provide a great difference in resolution between an upper section and a lower section of each image so that the number of pixels of each of optical flows in the image area can be simply put as the "velocity" of each velocity distribution. In a case where the camera is disposed at a lower position wherein a great difference is caused in resolution between the upper section and the lower section of the image, it is desirable to use camera parameters employed at capturing the image to convert the length of each optical flow into the length of a line based on a real coordinate system, and then into an actual movement velocity, before counting the optical flows.

The normality-evaluating-index calculating means 5 calculates an average μ and a standard deviation σ from the velocity distribution provided by the optical-flow attribute counting means 4 and determines velocity evaluation values that define a normal range based on these values.

Given that it is normal that the people in a crowd walk in concert substantially at the same pace, it is assumed that velocities at which the people walk in a normal state substantially follow a normal distribution even when personal differences by age and sex are taken into account. Accordingly, μ−2σ and μ+2σ, for example, which are respectively a lower limit and an upper limit of a range of 95% of the velocities of the normal distribution, are put as lower and upper limit evaluation values respectively of a normal velocity range of the block at the time. The lower and upper limit evaluation values, however, are not necessarily limited to these, and in a case where the age structure of the crowd for example is unbalanced, the velocities may not follow the normal distribution and these values may be set properly according to the time and place at which the evaluation is made, for example, to μ−3σ and μ+3σ or the like.

The abnormal-state judging means 6 compares the upper and lower limit evaluation values of the normal velocity range calculated by the normality-evaluating-index calculating means 5 with each of the velocities of optical flows and, if there is an optical flow or flows outside the normal velocity range, judges that "there is an intermingled movement that is different in velocity from others in the surrounding area".

In FIG. 11A, a bin 113 in the histogram 111 is erected over an interval in which the average μ in this distribution falls, and a range defined by the two arrow heads of an arrow 114 is a range of μ−2σ to μ+2σ. In FIG. 11B, a bin 115 in the histogram 112 is erected over an interval in which the average μ in this distribution falls, and a range defined by the two arrow heads of an arrow 116 is a range of μ−2σ to μ+2σ. In the histogram 112, all the optical flows are included within the normal range of μ−2σ to μ+3σ, so that it is judged that the judgment block 10ƒ of FIG. 10 is in a "normal" state. On the other hand, in the histogram 111, optical flows in a circle denoted by Reference numeral 117 are outside the normal range, so that it is judged that the block 101 is in an "abnormal" state.

In the process of judgment, a maximum value and a minimum value of velocities are obtained and these values are compared with the upper and lower limit evaluation values of the normal velocity range.

As in the first embodiment, the output means 7 outputs the processing process and judgment result on a monitor screen and/or records and stores the same into a recording device.

Figure 12:
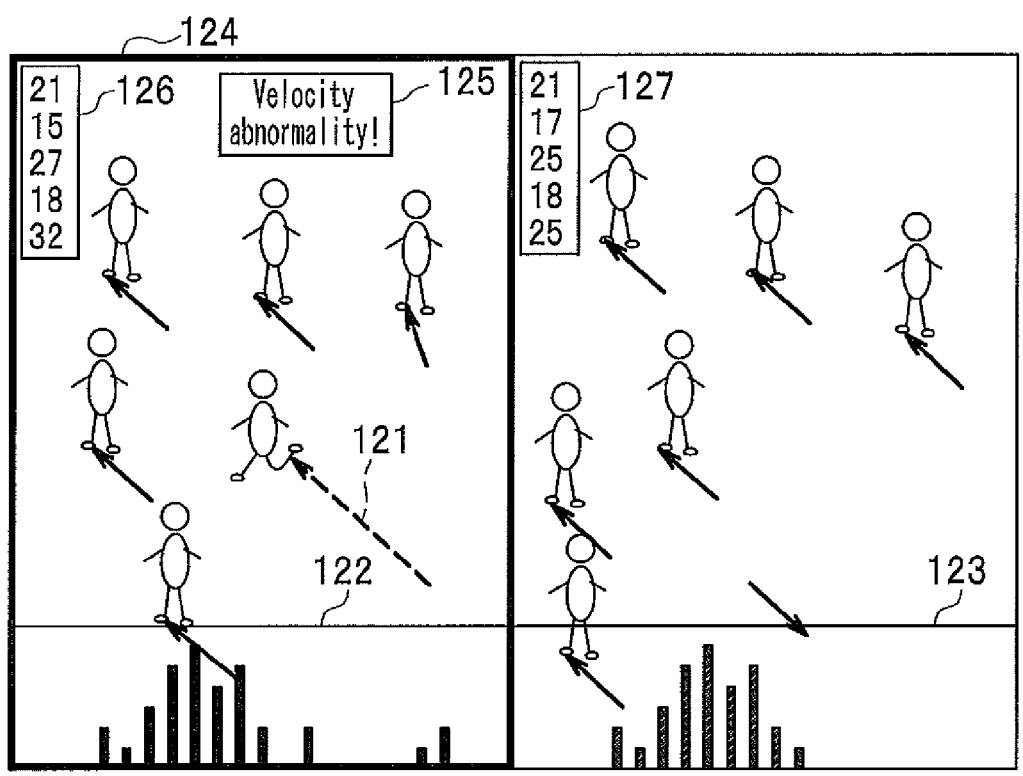
FIG. 12 is a view showing an example of an image area output on the monitor screen in the third embodiment.

FIG. 12 is a view showing an example of an image area output on the monitor screen in the third embodiment. As shown in rectangles 122, 123, velocity distributions are shown in the image area. Also, as shown in the rectangles 126, 127, evaluation values such as an average μ, a normal-range lower limit μ−2σ, a normal-range upper limit μ+3σ, a velocity minimum value, a velocity maximum value, calculated by the normality-evaluating-index calculating means 5, are shown in the image area.

Further, in a case where the abnormal-state judging means 6 judges that there is a block that is in an abnormal state, it is effective to depict an optical flow or flows of which velocities are outside the normal range, in a color different from the colors of other optical flows (in FIG. 12, indicated in dotted lines) to allow optical flows with different velocities to be spotted. In addition, in a case where the abnormal-state judging means 6 judges that there is a block in an abnormal state, the edge of the block may be enhanced with a rectangle in a bold line as denoted by Reference numeral 124 together a display 125 showing the type of an abnormal state. In this operation, the bold line of the rectangle and characters in the display 125 may be depicted in a color predetermined for each type of the abnormal state, which is effective to make it easier for an observer to use his intuitions to acknowledge the type of the abnormal state.

In the above example, the evaluation values are displayed in the same image area on the monitor screen. It is possible, however, to display the evaluation values of each index on one of the monitor screens, or display the evaluation values of different indices in different blocks on the same monitor screen, or switch image areas from one to another wherein one image area displays the evaluation values of each index, by a click with a mouse or an input with a keyboard, as in the case with the first embodiment. In the above, the third embodiment has been described.

The optical-flow attribute counting means 4 may convert respective lengths of the optical flows generating in the judgment block into distances based on world coordinates, before providing a velocity distribution of the optical flows.

Fourth Embodiment

Now a fourth embodiment will be described. In the fourth embodiment, an abnormal state is detected based on a change in time of the count of an attribute of optical flows of each block. In the following paragraphs, an example will be described in which the "abrupt change" that is an abrupt change of the number of optical flows occurring in the block is detected as the abnormal state.

FIGS. 13A and 13B are views showing an example in which on video images input by the video image input means 1 at different times, optical flows calculated by the optical-flow calculating means 2 are overlaid. An image of FIG. 13A is captured and input at time t, and an image of FIG. 13B is captured and input at time t+n, which is a time later by n frames than the time at which the image of FIG. 13A is captured and input. A judgment block 131 of FIG. 13A and the judgment block 137 of FIG. 13B are the same block but are captured at different times by n frames. The relations between a judgment block 132 and a judgment block 138 and between a judgment block 133 and a judgment block 139 are the same as that between the judgment block 131 and the judgment block 137.

In a scene shown in the image at time t of FIG. 13A, a crowd is standing still during an event or the like, and there are no optical flows to be calculated. In contrast, in a scene of the image at time t+n of FIG. 13B, the event is finished and the crowd is starting to move.

The optical-flow attribute counting means 4 counts optical flows that have occurred in each block every frame or every number of frames.

Figure 14:
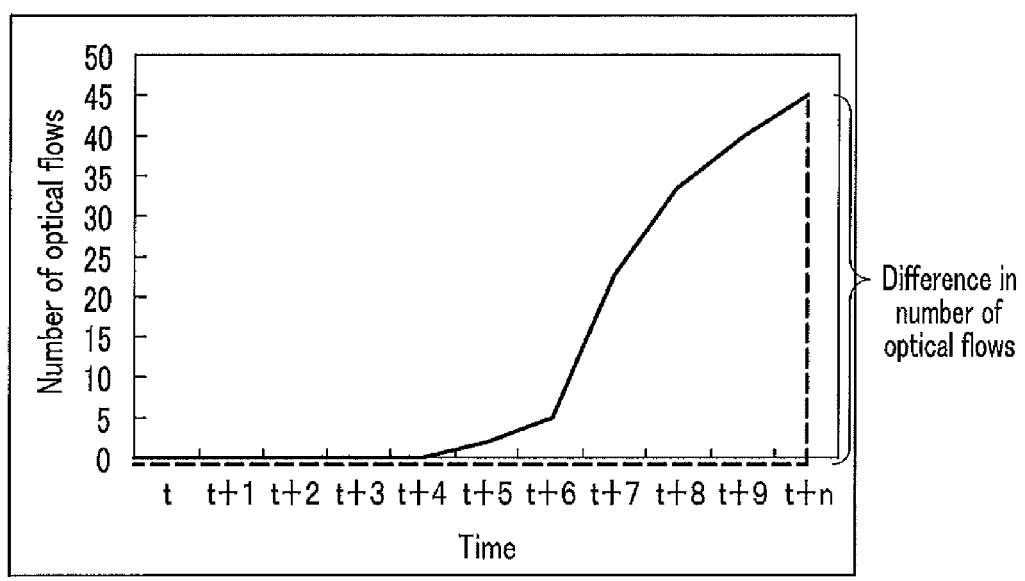
FIG. 14 is a view explaining changes in the number of optical flows in time in the fourth embodiment.

FIG. 14 is a view explaining changes in the number of optical flows in time in the fourth embodiment. The graph of FIG. 14 shows time changes in the number of optical flows in the judgment block 131 wherein counting is made of optical flows of a number of previous frames, for each frame. More specifically, with reference to FIG. 14, at time t, there are 0 (zero) optical flows, although the number of optical flows starts increasing at time t+4 to reach 45 at time t+n.

The normality-evaluating-index calculating means 5 determines a difference between the number of optical flows at the present time and the number of optical flows at a time earlier by n frames, as an evaluation value (n is a constant). In the case of this example, the difference between the numbers of optical flows is 45 as described above.

The abnormal-state judging means 6 judges that there is an abnormal state by determining that, when the number of optical flows determined by the normality-evaluating-index calculating means 5 exceeds a threshold value, an amount of movements of people is abruptly increased. For example, if the threshold value is set to 40, the difference between the numbers of optical flows exceeds the threshold value at time t+n, and the "abnormal state" judgment is issued. In this example, detection is made of an abrupt increase in the number of optical flows. However, it is possible to detect both an abrupt increase and an abrupt decrease in the number with an absolute value.

As in the above-described embodiments, the output means 7 outputs on the monitor screen, the numbers of optical flows, which are counts of the attribute, optical flow number differences serving as an evaluation value, which are the processing process, judgment result and the like.

So far, the fourth embodiment has been described. In the present embodiment, comparison is made of time-series values counts of the attribute of optical flows and if a change or changes are detected, it is judged that an "abnormal" state has occurred. In this embodiment, the number of optical flows is taken as an example of the attribute. However, also for the direction distribution and the velocity distribution which are the counts in the above-described embodiments, it is possible to compare time-series data items, and, if there is a difference or differences, judge that "abnormality" has occurred.

Fifth Embodiment

Now, a fifth embodiment will be described. In the fifth embodiment, the count of optical flows calculated for each block of a frame is compared with that of optical flows generated in another block of the frame, and when there is a difference, an abnormal state is detected. In this embodiment, an example is taken in which "evasion" that causes a difference between a block in which the evasion has occurred and the adjacent blocks is detected as the abnormal state.

In the image of FIG. 13B, people are in motion and there are optical flows calculated in the judgment blocks 137, 139 and judgment blocks 13a, 13b, 13c. In the judgment block 138, on the other hand, there are people standing and talking with each other and there are no optical flows calculated. The optical-flow attribute counting means 4 counts optical flows generated in each of all the judgment blocks within the image area.

The normality-evaluating-index calculating means 5 determines an evaluation value used in comparing the number of optical flows generated in a given judgment block with the number of optical flows generated in each of the surrounding judgment blocks. For example, an evaluation value for a given judgment block is obtained by multiplying by a factor an average of the numbers of optical flows generated in the surrounding judgment blocks.

In the example of FIG. 13B, the evaluating index for the judgment block 138 is an average of the numbers of optical flows generated in the judgment blocks 137, 139, 13a, 13b, 13c surrounding the judgment block 138. The factor is a threshold value to determine the magnitude of the difference between the number of the optical flows generated in a block and an average of the numbers of optical flows generated in the surrounding blocks. Thus, for example, 50% of the average of the numbers of optical flows of the surrounding blocks is determined to be the threshold value, and the factor is set to 0.5. In the example of FIG. 13B, the evaluating index is 2.6*0.5=1.3.

The abnormal-state judging means 6 compares the evaluation value calculated by the normality-evaluating-index calculating means 5 with the number of optical flows generated in a judgment block, and if the number of optical flows generated in the judgment block is less than the evaluation value, judges that the judgment block is in an "abnormal" state. In other words, if the number of optical flows generated in the judgment block is not more than a half the average of the numbers of optical flows generated in the surrounding judgment blocks, the judgment block is judged as having an extremely less number of optical flows than the average of the surrounding judgment blocks.

In the case of the example, the number of optical flows generated in the judgment block is zero, and thus is not more than the evaluation value, which leads to issue of the judgment "abnormal" state. The particular of the abnormal state may be that, as shown in FIG. 13B, people are stagnant standing talking for example, which produces no optical flows in that judgment block but produces in the surrounding judgment blocks, optical flows to evade those people.

As in the above-described embodiments, the output means 7 depicts the numeral of a value for the evaluating index in each judgment block and when it is judged that a block is in an "abnormal" state, highlights the edge of that block in a color different from those of others, and displays the type of the abnormal state. In the above, the fifth embodiment has been described.

Further, for example, a direction distribution and a velocity distribution may be combined together to create a direction-velocity distribution, based on which an abnormal-state judgment is made when an optical flow having a particular direction and velocity has been generated.

Sixth Embodiment

Now, a sixth embodiment will be described. In the sixth embodiment, a monitoring system provides the plurality types of abnormal-state judgments made in the above-described embodiments. The invention according to the present embodiment has the configuration of FIG. 1.

Figure 15:
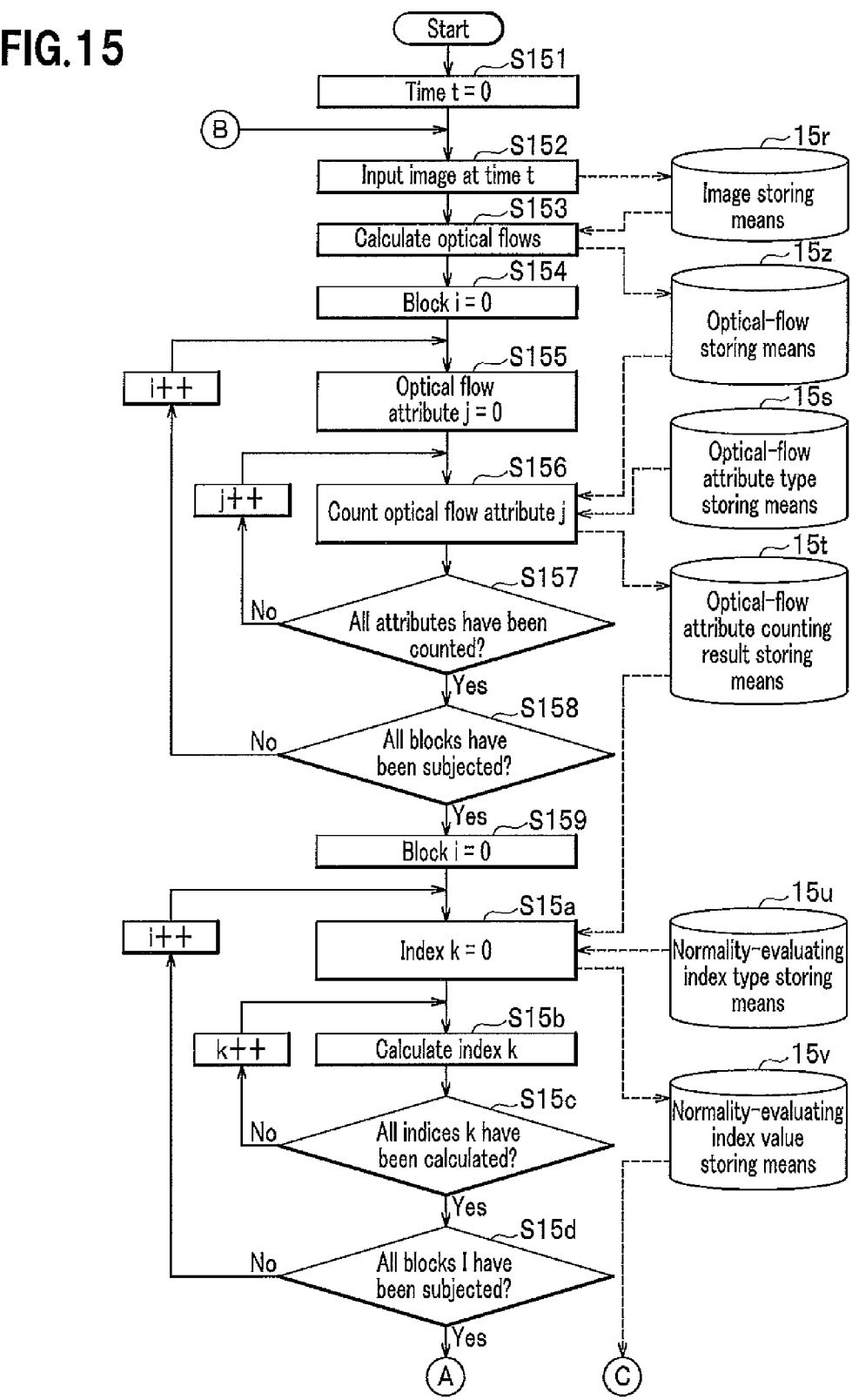
FIG. 15 is a view showing a part of a flow of processing of the monitoring system MS that inputs video images from the surveillance camera, and makes and outputs a plurality of abnormal condition judgments.
Figure 16:
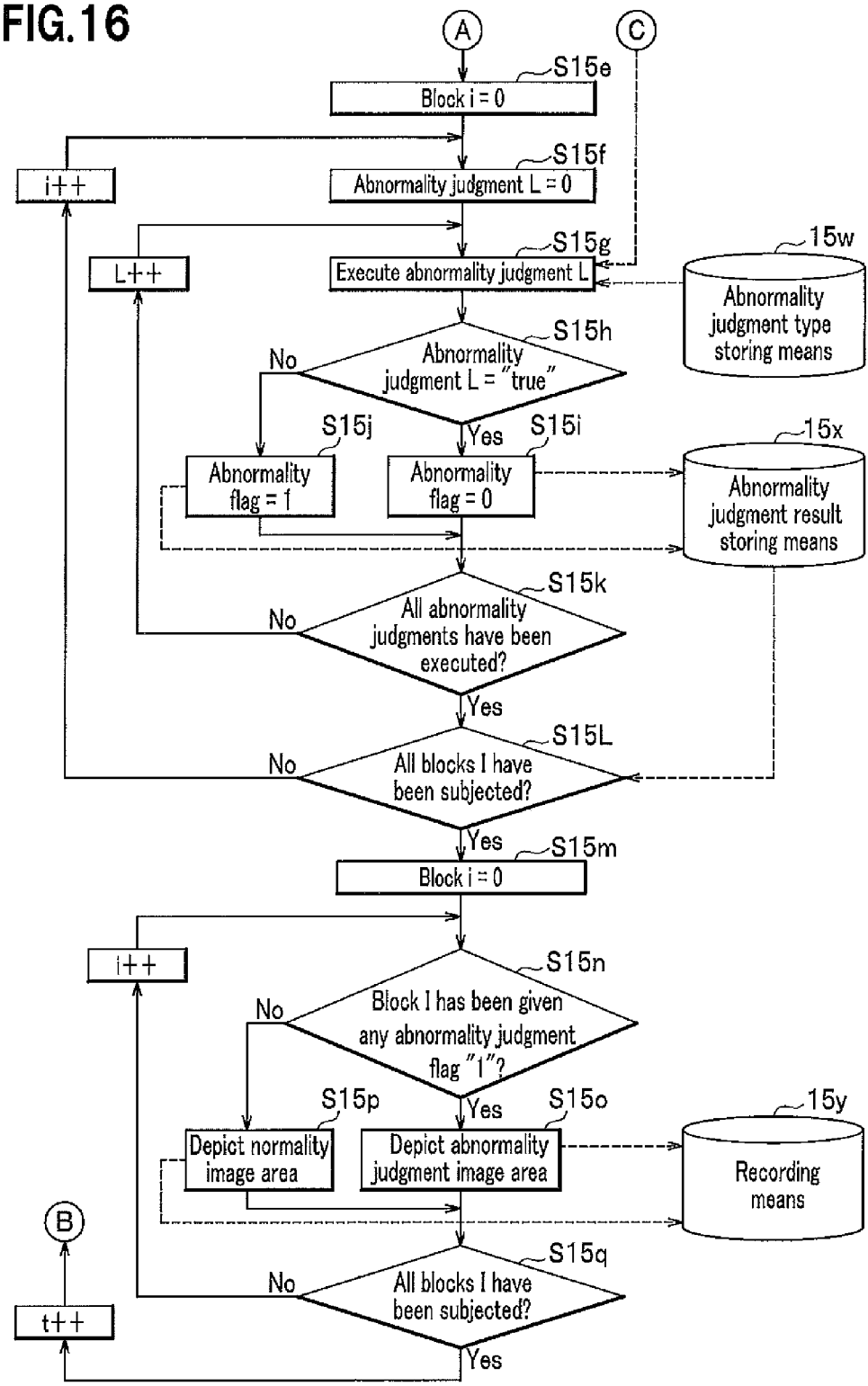
FIG. 16 is a view showing the other part, than that of FIG. 15, of the flow of processing of the monitoring system MS that inputs video images from the surveillance camera, and makes and outputs a plurality of abnormal condition judgments.

FIG. 15 and FIG. 16 are views showing a flow of processing of the monitoring system MS that inputs video images from the surveillance camera, and outputs a plurality of abnormal condition judgments. FIG. 1 is referred to when necessary. In the processing flow of FIG. 15, steps S151 and S152 are performed by the video image input means 1, step S153 is performed by the optical-flow calculating means 2, steps S154-S158 are performed by the optical-flow attribute counting means 4, and steps S159, S15a-S15d are performed by the normality-evaluating-index calculating means 5. Further, in FIG. 16, steps S15e-S15L are performed by the abnormal-state judging means 6, and steps S15m-S15q are performed by the output means 7.

In the present embodiment, a list of optical flow attributes (such as direction distribution) is stored in an optical-flow attribute type storing means 15s, a list of normality-evaluating indices (such as direction concentration and reverse movement degree) is stored in the normality-evaluating index type storing means 15u, and a list of abnormal condition judgments is stored in the abnormality judgment type storing means 15w, and the optical-flow attribute counting means 4, the normality-evaluating-index calculating means 5, and the abnormal-state judging means 6 each execute all items recited in the corresponding list in order. This allows simultaneous executions of the plurality of abnormal-state judgments and simultaneous uses of evaluating indices for the judgments. Further, changes may be made to one or more of the lists of normality-evaluating indices, normality-evaluating indices, and judgment types in order to change the type of abnormality judgment to be executed or add another type thereof.

Now, the processing flow will be described.

The video image input means 1, in step S151, resets a time counter to zero at the start of the processing, and in step S152, inputs and stores an image into an image storing means 15r at time t.

The optical-flow calculating means 2, in step S153, calculates optical flows from the image at time t and an image at t−n earlier than time t that have been stored in the image storing means 15r, and stores those optical flows into an optical-flow storing means 15z, more specifically, stores coordinates of a start point and coordinates of an end point of each of the calculated optical flows.

The optical-flow attribute counting means 4, in step S154, resets to zero a counter i for judgment blocks on the image that have been set by the judgment-block setting means 3 and performs processing for each block in the subsequent steps S155 to S157. More specifically, in step S155, the optical-flow attribute counting means 4 resets an optical-flow attribute counter j to zero. In step S156, the optical-flow attribute counting means 4 reads out a j-th optical-flow attribute type from the list of optical flow attributes stored in the optical-flow attribute type storing means 15s (see FIGS. 17A and 17B) and counts the attribute. In a case of the direction distribution for example, counting the attribute refers to counting the optical flows according to the directions of FIG. 4. In a case of the velocity distribution, it refers to counting the optical flows according to respective lengths thereof.

FIGS. 17A and 17B are views explaining items to be stored in the optical-flow attribute type storing means and in an optical-flow attribute counting result storing means. FIG. 17A shows the content stored in the optical-flow attribute type storing means 15s. The content stored in the optical-flow attribute type storing means 15s is made up of attribute types and IDs indicative of the attribute types. Counting of optical flows for each of the attributes corresponding to the respective attribute IDs (for the details of the processing of counting, refer to the paragraphs describing the first to fifth embodiments) is carried out by the optical-flow attribute counting means 4. It is possible to add to the list an attribute II) and an attribute type to add a new attribute to be counted by the optical-flow attribute counting means 4.

The optical-flow attribute counting means 4 stores, into an optical-flow attribute counting result storing means 15t, the attribute of optical flows counted in step S156. FIG. 17B shows an example of the items stored in the optical-flow attribute counting result storing means 15t. The results of counting are stored in a format categorized according to time into groups, each group in a tabular format of blocks and attribute types. The optical-flow attribute counting means 4, in step S157, judges whether or not all the attributes have been counted. If all the attributes have been counted (in step S157, Yes), the process goes to step S158 and if not all the attributes have yet been counted (in step S157, No), the process returns to step S156 after causing the optical-flow attribute counter j to advance by one.

The optical-flow attribute counting means 4, in step S158, judges whether or not all the blocks have been subjected to the processing of counting. If all the blocks have been subjected (in step S158, Yes), the process goes to step S159, and if not all the blocks have yet been subjected, the process returns to step S155 after causing the block counter i to advance by one.

The normality-evaluating-index calculating means 5 executes the following processing in steps S159 to S15d. More specifically, the normality-evaluating-index calculating means 5, in step S159, resets the counter i for the judgment blocks on the image set by the judgment-block setting means 3 to zero, and in step S15a, resets a counter k for normality-evaluating indices to zero.

The normality-evaluating-index calculating means 5, in step S15b, reads out a k-th index stored in the normality-evaluating index type storing means 15u and calculates an evaluation value of the evaluating index k. For calculation, the normality-evaluating-index calculating means 5 reads out necessary values from the counts of the attributes stored in the optical-flow attribute counting result storing means 15t. For example, for calculating an evaluation value of "direction concentration", a direction distribution of each of blocks I at time t is read out.

FIGS. 18A and 18B are views explaining items stored in the normality-evaluating index type storing means and in a normality-evaluating index value storing means. FIG. 18A shows an example of the normality-evaluating index type storing means 15u. The normality-evaluating index type storing means 15u is made up of normality-evaluating index types and IDs of the normality-evaluating index types. Calculation of normality-evaluating indices corresponding to the respective index IDs (for the details of the processing of calculation, refer to the paragraphs describing the first to fifth embodiments) is carried out by the normality-evaluating-index calculating means 5. It is possible to add to the list a normality-evaluating index type and an ID of the normality-evaluating index type to add a new normality-evaluating index of which evaluation values are to be calculated by the normality-evaluating-index calculating means 5.

The normality-evaluating-index calculating means 5 stores the normality-evaluating indices calculated in step S15b in the normality-evaluating index value storing means 15v. FIG. 18B shows examples of items stored in the normality-evaluating index value storing means 15v. The results of calculation are stored in a format categorized according to time into groups, each group in a tabular format of blocks and normality-evaluating index types. The normality-evaluating-index calculating means 5, in step S15c, judges whether or not all the normality-evaluating indices have been calculated. If all the normality-evaluating indices have been calculated (in S15c, Yes), the process goes to S15d, and if not all the normality-evaluating indices have yet been calculated (in S15c, No), the process returns to step 15b after causing the index counter k to advance by one.

The normality-evaluating-index calculating means 5, in S15d, judges whether or not all the blocks have been subjected to the processing of normality-evaluating-index calculation. If all the blocks have been subjected (in S15d, Yes), the process goes to step S15e, and if not all the blocks have yet been subjected (in S15d, No), the process returns to step S15a after causing the block counter i to advance by one.

The abnormal-state judging means 6 performs processing in the subsequent steps S15e to S15L shown in FIG. 16. More specifically, the abnormal-state judging means 6, in step S15e, resets the counter i for the judgment blocks on the image set by the judgment-block setting means 3 to zero, and in step S15f, resets a counter L for abnormal-state judgments to zero.

The abnormal-state judging means 6, in step S15g, reads out an L-th abnormal-state judgment stored in an abnormality judgment type storing means 15w, and executes the abnormal-state judgment. For executing the judgment, the abnormal-state judging means 6 reads out necessary indices from the normality-evaluating index value storing means 15v. In a case of a "reverse movement" judgment for example, "direction concentration", "angle", "reverse movement degree" of the block I at time t are read out and evaluation values thereof are calculated.

FIGS. 19A and 19B are views showing items stored in the abnormality judgment type storing means and in an abnormality judgment result storing means. FIG. 19A shows an example of the abnormality judgment type storing means 15w. The abnormality judgment type storing means 15w is made up of abnormal-state judgment types and IDs of the abnormal-state judgment types. Judgment on abnormal-state judgment types corresponding to the respective IDs of the abnormal-state judgment types (for the details of the processing of judgment, refer to the paragraphs describing the first to fifth embodiments) is carried out by the abnormal-state judging means 6. It is possible to add to the list an abnormal-state judgment type and an ID of the abnormal-state judgment type to add a new abnormal-state judgment type on which judgment is to be made by the abnormal-state judging means 6.

The abnormal-state judging means 6, in step S15h, judges whether or not the abnormal-state judgment made in step S15g is "true". If the abnormal-state judgment made in step S15g is "true" (in step S15h, Yes), it is judged that an abnormal-state L has occurred, and the process goes to step S15i. If the abnormal-state judgment made in step S15g is not "true" (in step S15h, No), it is judged that no abnormal state L has occurred, and the process goes to step S15j.

The abnormal-state judging means 6, in S15i, sets an abnormality-judgment-L flag to "1" indicating that an abnormal state L has occurred, and stores the flag "1" into the abnormality judgment result storing means 15x. The abnormal-state judging means 6, in S15j, sets the abnormality-judgment-L flag to "0" indicating that no abnormal state L has been occurred in the block I, and stores the flag "0" into the abnormality judgment result storing means 15x. FIG. 19B shows an example of the abnormality judgment result storing means 15x. The results of judgment, i.e., the flag "0" or "1" are stored in a format categorized according to time into groups, each group in a tabular format of blocks and abnormal-state judgment types.

The abnormal-state judging means 6, in step S15k, judges whether or not all the abnormal-state judgments have been executed. If all the abnormal-state judgments have been executed (in step S15k, Yes), the process goes to step S15L, and if not all the abnormal-state judgments have yet been executed (in step S15k, No), the process returns to step S15g after causing the abnormal-state judgment type counter L to advance by one.

The abnormal-state judging means 6, in step S15L, judges whether or not all the blocks have been subjected to the processing of abnormal-state judgment. If all the blocks have been subjected (in step S15L, Yes), the process goes to step S15m, and if not all the blocks have yet been subjected (in step S15L, No), the process returns to step S15f after causing the block counter i to advance by one.

The output means 7 performs processing in the subsequent steps S15m to S15q. More specifically, the output means 7, in step S15m, resets the counter i for the judgment blocks on the image set by the judgment-block setting means 3 to zero.

The output means 7, in step S15n, reads out the abnormality judgment result storing means 15x and judges whether or not the block I at the current time t has been given an abnormal-state judgment flag or flags "1", that is, an abnormal-state judgment or judgments. If there is at least one flag "1", that is, at least one abnormal-state judgment (in step S15n, Yes), the process goes to step S15o, and if there is no abnormal-state judgment (in step S15n, No), the process goes to step S15p. The output means 7, in step S15o, depicts the type of an abnormal-state judgment or judgments (for example, by the rectangle 95 and the indication 96 of FIG. 9) on the image area and outputs it into a monitor screen or a memory.

Figure 20:
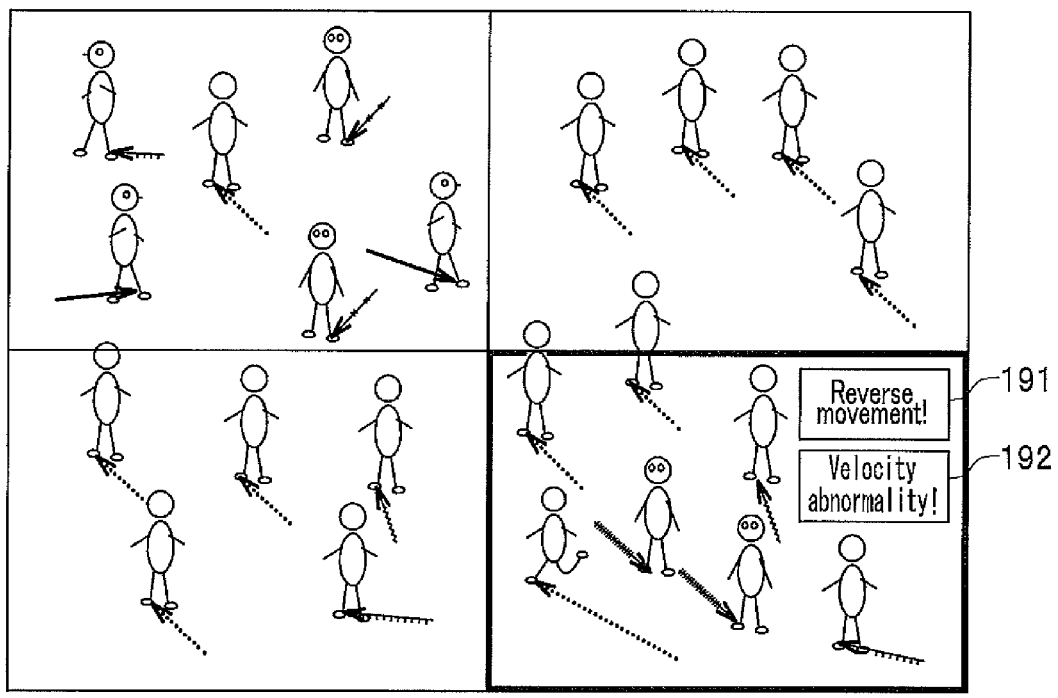
FIG. 20 is a view showing an example of how to output a judgment result when a plurality of abnormal-state judgment flags are "0".

FIG. 20 is a view showing an example of how to output judgment results of a plurality of abnormal-state judgment flags "1". As shown in FIG. 20, if the same block is given a plurality of abnormal-state judgment flags "1", a plurality of displays, for example, displays 191 and 192 are made to depict the types of abnormal-state judgments. Or, a single display depicting an abnormal-state judgment which has a high priority may be made, if possible, by determining the priority of abnormal-state judgment types in advance.

The output means 7, in step S15p, depicts a normal state if all the abnormal-state judgment flags for all the abnormal-state judgment types are "0". Examples of how to depict a normal state include not depicting abnormal-state judgment, as shown in the image areas of FIG. 7 and FIG. 8, in the image area with the rectangles 91, 92, 93 of FIG. 9, and in the image area with displays 123 and 127 of FIG. 12. For depicting a normal state image area, what is a default image area is defined beforehand, and inputs are made with a mouse or a keyboard upon requirement, or an exclusive-use "Options" menu interface is prepared so that switching between the two windows is done using the "Options" menu.

The output means 7, in step S15q, judges whether or not all the blocks have undergone the output processing. If all the blocks have undergone the output processing (in step S15q, Yes), the process returns to step S152 of FIG. 15, in which processing with time t advanced to the next value is executed. If not all the blocks have yet undergone the output processing (in step S15q, No), the process returns to step S15n after causing the block counter i to advance by one.

In the above, the monitoring system MS according to the sixth embodiment has been described. In the sixth embodiment, throughout all the time zones, all the blocks are subjected to all the abnormal-state judgments. Depending on the characteristics of a place to be monitored, however, abnormal-state judgments to be made, priority thereof, or the like may be changed by time zone, by block or the like. For example, by clarification of the characteristics of a place to be monitored, such as the flow of people or ages of passers-by changing in time, it is possible to change the type of abnormal-state judgment by time or change the priority of abnormal-state judgment by block in the same image. In such a case, it is possible to arrange the lists to be stored in the optical-flow attribute type storing means 15s, the normality-evaluating index type storing means 15u, and the abnormality judgment type storing means 15w according to the time or block and process the items in each list according to the time or block.

All the embodiments will be summarized in the below.

The monitoring system MS of the first embodiment comprises: a video image input means 1 for capturing and inputting video images of a crowd including a plurality of moving objects; an optical-flow calculating means 2 for calculating optical flows from the video images captured at different times; a judgment-block setting means 3 for setting a surveillance area provided on each video image to judgment blocks each serving as a unit to be subjected to an abnormality judgment; an optical-flow attribute counting means 4 for counting an attribute of optical flows generated in each judgment block; a normality-evaluating-index calculating means 5 for calculating, from the counted attribute of the optical flows, an evaluation value of a normality-evaluating index for evaluating a normality of the judgment block; an abnormal-state judging means 6 for judging, from the evaluation value of the normality-evaluating index, the abnormal state of the judgment block; and an output means 7 for outputting a result of the judgment made by the abnormal-state judging means onto the video image. The output means 7 may be configured to enhance the edge of an area where an abnormal state has occurred with a rectangle to highlight the edge, as shown in FIG. 9.

The output means 7 may be configured to assign colors respectively to directions of the distribution provided according to the direction provided in the first embodiment, color-code the optical flows according to which direction of the distribution each optical flow belongs to, and overlay and display the color-coded optical flows on the video image. Further, the output means 7 may be configured to overlay and display the distribution provided according to the direction on the judgment block of the video image.

Further, when the abnormal-state judging means 6 judges the abnormal state of the judgment block, the output means 7 may be configured to highlight the judgment block judged as being in the abnormal state with a rectangle depicted in a color assigned according to the type of the abnormal state. Moreover, the output means 7 may be configured to depict the numeral of an evaluation value calculated by normality-evaluating-index calculating means 5 in the block of the video image, and when it is judged that the evaluation value calculated by the abnormal-state judging means exceeds a threshold value, depict the numeral in a color different from one assigned to a case where it is judged otherwise.

In the second embodiment, it is possible that the normality-evaluating-index calculating means 5 calculates an entropy from the direction distribution, and the abnormal-state judging means 6 judges an area having a greater entropy as an area having a disturbance in a stream.

The third embodiment, it is possible that the optical-flow attribute counting means 4 counts the optical flows generated in each judgment block by velocity and provides a velocity distribution of the optical flows, and the output means 7 outputs a velocity distribution to a monitor.

In the third embodiment, it is possible that the normality-evaluating-index calculating means 5 calculates, as evaluation values of normality-evaluating indices, an average $\mu$ of the velocity distribution, a standard deviation $\sigma$ of the velocity distribution, and either one of a range between a lower limit $\mu-2\sigma$ of a normal range of the velocity distribution and an upper limit $\mu+2\sigma$ of the normal range and a range between a lower limit $\mu-3\sigma$ of the normal range and upper limit $\mu+3\sigma$ of the normal range, and when there is an optical flow outside the either one of the ranges, the abnormal-state judging means judges that the block is in an abnormal state having velocity abnormality in which there is a movement different in velocity from others.

Further, the optical-flow attribute counting means 4 may convert respective lengths of the optical flows generating in the judgment block into distances based on world coordinates, before providing the velocity distribution of the optical flows. Moreover, the output means 7 depicts the optical flow outside the either one of the ranges in a color different from one in which the rest of the optical flows are depicted and overlays the optical flow depicted in the different color on the video image before outputting.

In the fourth embodiment, it is possible that the optical-flow attribute counting means 4 counts the number of the optical flows generated in the judgment block, and when a difference between the number of optical flows at the present time and the number of optical flows at a time earlier by a given time period exceeds a threshold value, the normality-evaluating-index calculating means 6 judges that the block is in the abnormal state as "abrupt change".

In the fifth embodiment, it is possible that the optical-flow attribute counting means 4 counts the number of the optical flows generated in the judgment block, and when a difference between the number of optical flows generated in a target judgment block and the number of optical flows generated in a block existing in a surrounding area exceeds a threshold value, the abnormal-state judging means 6 judges that the target block is in the abnormal state as "evasion".

In the sixth embodiment, it is possible that the output means 7 depicts either one of a normal state or the abnormal state judged by the abnormal-state judging means onto the video image before outputting the judged state onto a monitor or a recording means.

According to the embodiments, it is possible to quantify a state of a scene where a crowd exist from a distribution according to an attribute of movements of the crowd for detecting an area where an abnormal movement has occurred.

EXPLANATION OF REFERENCE NUMERALS 1 video image input means
2 optical-flow calculating means
3 judgment-block setting means
4 optical-flow attribute counting means
5 normality-evaluating-index calculating means
6 abnormal-state judging means
7 output means
15$r$ image storing means
15$z$ optical-flow storing means
15$s$ optical-flow attribute type storing means
15$t$ optical-flow attribute counting result storing means
15$u$ normality-evaluating index type storing means
15$v$ normality-evaluating index value storing means
15$w$ abnormality judgment type storing means
15$x$ abnormality judgment result storing means
15$y$ recording means
MS monitoring system

The invention claimed is:
1. A monitoring system that captures and inputs video images of a crowd including a plurality of moving objects for detecting an abnormal state of the crowd from movement data obtained from the video images, the monitoring system comprising:
  a video image input device configured to capture and input the video images of the crowd;
  an optical-flow calculating device configured to calculate optical flows from the video images captured at different times;
  a judgment-block setting device configured to set judgment blocks on a surveillance area of each video image, each judgment block serving as a unit to be judged about an abnormality;
  an optical-flow attribute counting device configured to count attribute data of optical flows generated in each judgment block;
  a normality-evaluating-index calculating device configured to calculate, from the counted attribute data of the optical flows, an evaluation value of a normality-evaluating index for evaluating a normality of the judgment block;
  an abnormal-state judging device configured to judge, from the evaluation value of the normality-evaluating index, the abnormal state of the judgment block; and
  an output device configured to output a result of the judgment made by the abnormal-state judging device onto the video image, wherein the optical-flow attribute counting device quantifies, as the attribute data, directions of the optical flows generated in the judgment block, divides the quantized directions into groups and counts quantified directions of each group to create a direction distribution of the optical flows, wherein the normality-evaluating-index calculating device determines top two directions of optical flows from the direction distribution, calculates evaluation values of a respective three normality-evaluating indices which are a direction concentration, an angle, and a reverse movement degree, the direction concentration being a degree of concentration of the number of optical flows having the top two directions, the angle being an angle formed between the top two directions, and the reverse movement degree being a ratio of the number of optical flows having one of the top two directions to the number of optical flows having the other direction, and wherein the abnormal-state judging device judges whether the judgment block has a reverse movement against a main stream as the abnormal state, based on the evaluation values of the three normality-evaluating indices.

2. A monitoring system that captures and inputs video images of a crowd including a plurality of moving objects for detecting an abnormal state of the crowd from movement data obtained from the video images, the monitoring system comprising:

a video image input device configured to capture and input the video images of the crowd;

an optical-flow calculating device configured to calculate optical flows from the video images captured at different times;

a judgment-block setting device configured to set judgment blocks on a surveillance area of each video image, each judgment block serving as a unit to be judged about an abnormality;

an optical-flow attribute counting device configured to count attribute data of optical flows generated in each judgment block;

a normality-evaluating-index calculating device configured to calculate, from the counted attribute data of the optical flows, an evaluation value of a normality-evaluating index for evaluating a normality of the judgment block;

an abnormal-state judging device configured to judge, from the evaluation value of the normality-evaluating index, the abnormal state of the judgment block; and an output device configured to output a result of the judgment made by the abnormal-state judging device onto the video image, wherein the optical-flow attribute counting device quantifies, as the attribute data, directions of the optical flows generated in the judgment block, divides the quantized directions into groups and counts quantified directions of each group to create a direction distribution of the optical flows, and wherein the output device assigned colors respectively to the groups of the direction distribution, color-codes the optical flows according to which group each optical flow belongs to, and overlays and displays the color-coded optical flows on the video image.

3. The monitoring system of claim 1, wherein the output device overlays and displays the direction distribution on the judgment block of the video image.

4. A monitoring system that captures and inputs video images of a crowd including a plurality of moving objects for detecting an abnormal state of the crowd from movement data obtained from the video images, the monitoring system comprising:

a video image input device configured to capture and input the video images of the crowd;

an optical-flow calculating device configured to calculate optical flows from the video images captured at different times;

a judgment-block setting device configured to set judgment blocks on a surveillance area of each video image, each judgment block serving as a unit to be judged about an abnormality;

an optical-flow attribute counting device configured to count attribute data of optical flows generated in each judgment block;

a normality-evaluating-index calculating device configured to calculate, from the counted attribute data of the optical flows, an evaluation value of a normality-evaluating index for evaluating a normality of the judgment block;

an abnormal-state judging device configured to judge, from the evaluation value of the normality-evaluating index, the abnormal state of the judgment block; and an output device configured to output a result of the judgment made by the abnormal-state judging device onto the video image, wherein the optical-flow attribute counting device counts, as the attribute data, lengths of the optical flows generated in each judgment block to create a velocity distribution of the optical flows, and wherein the normality-evaluating-index calculating device calculates, as evaluation values of normality-evaluating indices, an average $\mu$ of the velocity distribution, a standard deviation $\sigma$ of the velocity distribution, and either one of a range between a lower limit $\mu-2\sigma$ of it normal range of the velocity distribution and an upper limit $\mu+2\sigma$ of the normal ranges and a range between a lower limit $\mu-3\sigma$ of the normal range and upper limit $\mu+3\sigma$ of the normal range, and wherein the abnormal-state judging device judges, when there is an optical flow outside the either one of the ranges, that the block is in an abnormal state which is a velocity abnormality in which there is a movement different in velocity from others.

5. A monitoring system that captures and inputs video images of a crowd including a plurality of moving objects for detecting an abnormal state of the crowd from movement data obtained from the video images, the monitoring system comprising:

a video image input device configured to capture and input the video images of the crowd;

an optical-flow calculating device configured to calculate optical flows from the video image captured at different times;

a judgment-block setting device configured to set judgment blocks on a surveillance area of each video image, each judgment block serving as a unit to be judged about an abnormality;

an optical-flow attribute counting device configured to count attribute data of optical flows generated in each judgement block;

a normality-evaluating-index calculating device configured to calculate, from the counted attribute data of the optical flows, an evaluation value of a normality-evaluating index for evaluating a normality of the judgment block;

an abnormal-state judging device configured to judge, from the evaluation value of the normality-evaluating index, the abnormal state of the judgment block; and an output device configured to output a result of the judgment made by the abnormal-state judging device onto the video image, wherein the optical-flow attribute counting device counts, as the attribute data, lengths of the optical flows generated in each judgment block to create a velocity distribution of the optical flows, and wherein the optical-flow attribute counting device converts the respective lengths of the optical flows generated in the judgment block into distances based on world coordinates, before creating the velocity distribution of the optical flows.

6. The monitoring system of claim 4, wherein the output device depicts the optical flow outside the either one of the ranges in a color different from one in which the rest of the optical flows are depicted and overlays the optical flow depicted in the different color on the video image before outputting.

7. A monitoring system that captures and inputs video images of a crowd including a plurality of moving objects for detecting an abnormal state of the crowd from movement data obtained from the video images, the monitoring system comprising:

a video image input device configured to capture and input the video images of the crowd;

an optical-flow calculating device configured to calculate optical flows from the video images captured at different times;

a judgment-block setting device configured to set judgment blocks on a surveillance area of each video image, each judgment block serving as a unit to be judged about an abnormality;

an optical-flow attribute counting device configured to count attribute data of optical flows generated in each judgment block;

a normality-evaluating-index calculating device configured to calculate, from the counted attribute data of the optical flows, an evaluation value of a normality-evaluating index for evaluating a normality of the judgment block;

an abnormal-state judging device configured to judge, from the evaluation value of the normality-evaluating index, the abnormal state of the judgment block; and an output device configured to output a result of the judgment made by the abnormal-state judging device onto the video image, wherein the optical-flow attribute counting device count the number of the optical flows generated in the judgment block, and wherein the normality-evaluating-index calculating devices judges that the block is in the abnormal state when a difference between the number of optical flows at the present time and the number of optical flows at a time earlier by a given time period exceeds a threshold value.

8. A monitoring system that captures and inputs video images of a crowd including a plurality of moving objects for detecting an abnormal state of the crowd from movement data obtained from the video images, the monitoring system comprising:

a video image input device configured to capture and input the video images of the crowd;

an optical-flow calculating device configured to calculate optical flows from the video images captured at different times;

a judgment-block setting device configured to set judgment blocks on a surveillance area of each video image, each judgment block serving as a unit to be judged about an abnormality;

an optical-flow attribute counting device configured to count attribute data of optical flows generated in each judgment block;

a normality-evaluating-index calculating device configured to calculate, from the counted attribute data of the optical flows, an evaluation value of a normality-evaluating index for evaluating a normality of the judgment block;

an abnormal-state judging device configured to judge, from the evaluation value of the normality-evaluating index, the abnormal state of the judgment block; and an output device configured to output a result of the judgment made by the abnormal-state judging device onto the video image, wherein the optical-flow attribute counting device counts the number of the optical flows generated in the judgment block, and wherein the abnormal-state judging device judges that a block is in the abnormal state when a difference between the number of optical flows generated in that judgment block and the number of optical flows generated in a block existing in a surrounding area exceeds a threshold value.

9. The monitoring system of claim 1, wherein when the abnormal-state judging device judges the abnormal state of the judgment block, the output device highlights the judgment block judged as being in the abnormal state with a rectangle depicted in a color assigned according to type of the abnormal state.

10. The monitoring system of claim 1, wherein the output device depicts the numeral of the evaluation value calculated by normality-evaluating-index calculating device on the block of the video image, and when it is judged that the evaluation value calculated by the abnormal-state judging device exceeds a threshold value, depicts the numeral in a color different from one assigned to a case where it is judged otherwise.

11. A monitoring system that captures and inputs video images of a crowd including a plurality of moving objects for detecting an abnormal state of the crowd from movement data obtained from the video images, the monitoring system comprising:

a video image input device configured to capture and input the video images of the crowd;

an optical-flow calculating device configured to calculate optical flows from the video images captured at different times;

a judgment-block setting device configured to set judgment blocks on a surveillance area of each video image, each judgment block serving as a unit to be judged about an abnormality;

an optical-flow attribute counting device configured to count attribute data of optical flows generated in each judgment block;

a normality-evaluating-index calculating device configured to calculate, from the counted attribute data of the optical flows, an evaluation value of a normality-evaluating index for evaluating a normality of the judgment block;

an abnormal-state judging device configured to judge, from the evaluation value of the normality-evaluating index, the abnormal state of the judgment block; and an output device configured to output a result of the judgment made by the abnormal-state judging device onto the video image, wherein the optical-flow attribute counting device quantifies, as the attribute data, directions of the optical flows generated in the judgment block, divides the quantized directions into groups and counts quantified directions of each group to create a direction distribution of the optical flows, and wherein the normality-evaluating-index calculating device calculates an entropy from the direction distribution, and wherein the abnormal-state judging device judges an area having a greater entropy as an area having a disturbance in a stream.

12. A monitoring method for monitoring movements of a crowd with a monitoring system configured to capture and input video images of the crowd including a plurality of moving objects for detecting an abnormal state of the crowd from movement data obtained from the video images, the monitoring method comprising the steps of:

capturing and inputting the video images of the crowd;

calculating optical flows from the video images captured at different times;

setting judgment blocks on a surveillance area of each video image, each judgment block serving as a unit to be judged about an abnormality, counting attribute data of optical flows generated in each judgment block;

calculating, from the counted attribute data the optical flows, an evaluation value of a normality-evaluating index for evaluating a normality of the judgment block;

judging, from the evaluation value of the normality-evaluating index, the abnormal state of the judgment block;

outputting a result of the judgment on the abnormal state onto the video image;

quantifying, as the attribute data, directions of the optical flows generated in the judgment block, dividing the quantified directions into groups and counting quantified directions of each group to create a direction distribution of the optical flows;

determining top two directions of optical flows from the direction distribution, provided according to the direction, calculating evaluation values of respective three normality-evaluating indices which are a direction concentration, an angle, and a reverse movement degree, the direction concentration being a degree of concentration of the number of optical flows having the top two directions, the angle being an angle formed between the top two directions, and the reverse movement degree being a ratio of the number of optical flows having one of the top two directions to the number of optical flows having the other direction;

judging a reverse movement against a main stream as the abnormal state, based on the evaluation values of the three normality-evaluating indices;

depicting the numerals of the evaluation values of the three normality-evaluating indices on the block of the video image; and when the result of the judgment is the abnormal state of the judgment block, highlighting, with a rectangle, the judgment block judged as being in the abnormal state.

* * * * *